United States Patent
Power et al.

(10) Patent No.: US 11,679,299 B2
(45) Date of Patent: Jun. 20, 2023

(54) PERSONALIZING PREDICTION OF PERFORMANCE USING DATA AND BODY-POSE FOR ANALYSIS OF SPORTING PERFORMANCE

(71) Applicant: STATS LLC, Chicago, IL (US)

(72) Inventors: Paul David Power, Leeds (GB); Aditya Cherukumudi, London (GB); Sujoy Ganguly, Chicago, IL (US); Xinyu Wei, Melbourne (AU); Long Sha, Chicago, IL (US); Jennifer Hobbs, Chicago, IL (US); Hector Ruiz, Barcelona (ES); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 143 days.

(21) Appl. No.: 16/804,964

(22) Filed: Feb. 28, 2020

(65) Prior Publication Data
US 2020/0276474 A1  Sep. 3, 2020

Related U.S. Application Data

(60) Provisional application No. 62/812,387, filed on Mar. 1, 2019.

(51) Int. Cl.
*A63B 24/00* (2006.01)
*G06N 3/08* (2023.01)
*G06N 20/00* (2019.01)

(52) U.S. Cl.
CPC ...... *A63B 24/0006* (2013.01); *A63B 24/0021* (2013.01); *A63B 24/0062* (2013.01);
(Continued)

(58) Field of Classification Search
CPC ............ A63B 24/0006; A63B 24/0021; A63B 24/0062; A63B 24/0087; G06N 20/00; G06N 3/08
See application file for complete search history.

(56) References Cited

U.S. PATENT DOCUMENTS

| 6,616,529 B1 | 9/2003 | Qian et al. |
| 6,710,713 B1 | 3/2004 | Russo |

(Continued)

FOREIGN PATENT DOCUMENTS

| CN | 1386241 | 12/2002 |
| CN | 105833502 | 8/2016 |

(Continued)

OTHER PUBLICATIONS

McCabe, et al., "Artificial Intelligence in Sports Prediction", Fifth International Conference on Information Technology; New Generation, IEEE Computer Society, Apr. 9, 2008, 4 pages.
(Continued)

*Primary Examiner* — Malina D. Blaise
(74) *Attorney, Agent, or Firm* — DLA Piper LLP (US)

(57) ABSTRACT

A method of generating a player prediction is disclosed herein. A computing system retrieves data from a data store. The computing system generates a predictive model using an artificial neural network. The artificial neural network generates one or more personalized embeddings that include player-specific information based on historical performance. The computing system selects, from the data, one or more features related to each shot attempt captured in the data. The artificial neural network learns an outcome of each shot attempt based at least on the one or more personalized embeddings and the one or more features related to each shot attempt.

20 Claims, 11 Drawing Sheets

(52) U.S. Cl.
CPC ........... *A63B 24/0087* (2013.01); *G06N 3/08* (2013.01); *G06N 20/00* (2019.01)

(56) References Cited

U.S. PATENT DOCUMENTS

| | | | |
|---|---|---|---|
| 9,342,785 | B2 | 5/2016 | Lucey et al. |
| 9,442,933 | B2 | 9/2016 | Tzoukermann |
| 10,201,752 | B2* | 2/2019 | Lucey .................... G06N 3/084 |
| 10,460,176 | B2 | 10/2019 | Chang et al. |
| 11,157,742 | B2 | 10/2021 | Zhang et al. |
| 11,182,806 | B1* | 11/2021 | Arfa .................... G06Q 30/0201 |
| 11,232,109 | B1* | 1/2022 | Knoll ................. G06F 16/24568 |
| 2002/0165697 | A1 | 11/2002 | Min |
| 2004/0148278 | A1 | 7/2004 | Milo et al. |
| 2005/0143198 | A1 | 6/2005 | Charge |
| 2006/0083304 | A1 | 4/2006 | Pan et al. |
| 2006/0149674 | A1 | 7/2006 | Cook et al. |
| 2006/0252476 | A1 | 11/2006 | Bahou |
| 2007/0293289 | A1 | 12/2007 | Loeb |
| 2008/0281444 | A1 | 11/2008 | Krieger et al. |
| 2009/0186679 | A1 | 7/2009 | Irvine et al. |
| 2009/0203447 | A2 | 8/2009 | Hansen et al. |
| 2010/0129780 | A1 | 5/2010 | Homsi et al. |
| 2010/0184495 | A1 | 7/2010 | Levy et al. |
| 2010/0184563 | A1 | 7/2010 | Molyneux et al. |
| 2010/0283630 | A1 | 11/2010 | Alonso |
| 2010/0298958 | A1 | 11/2010 | Connelly |
| 2011/0013087 | A1 | 1/2011 | House et al. |
| 2011/0169959 | A1 | 7/2011 | DeAngelis et al. |
| 2011/0173235 | A1 | 7/2011 | Aman et al. |
| 2011/0267461 | A1 | 11/2011 | Birenboim et al. |
| 2012/0162435 | A1 | 6/2012 | Elangovan et al. |
| 2012/0214602 | A1 | 8/2012 | Ahlstrom |
| 2013/0104870 | A1 | 5/2013 | Rizzo et al. |
| 2013/0110271 | A1 | 5/2013 | Fornell et al. |
| 2013/0225271 | A1 | 8/2013 | Amaitis |
| 2013/0238106 | A1 | 9/2013 | Ellis et al. |
| 2013/0267328 | A1 | 10/2013 | Heisler et al. |
| 2014/0142921 | A1 | 5/2014 | Gleadall et al. |
| 2014/0143183 | A1 | 5/2014 | Sigal et al. |
| 2014/0206479 | A1 | 7/2014 | Marty et al. |
| 2014/0236331 | A1 | 8/2014 | Lehmann et al. |
| 2014/0274245 | A1 | 9/2014 | Stickel |
| 2014/0302914 | A1 | 10/2014 | Weinstein et al. |
| 2014/0309000 | A1 | 10/2014 | Gustafson |
| 2014/0364976 | A1 | 12/2014 | Wohl et al. |
| 2015/0058730 | A1 | 2/2015 | Dubin et al. |
| 2015/0131845 | A1 | 5/2015 | Forouhar et al. |
| 2015/0142716 | A1 | 5/2015 | Lucey et al. |
| 2015/0148129 | A1 | 5/2015 | Austerlade et al. |
| 2015/0258416 | A1 | 9/2015 | Ianni et al. |
| 2015/0360134 | A1 | 12/2015 | Rodriguez |
| 2016/0007054 | A1 | 1/2016 | Polumbus et al. |
| 2016/0096071 | A1 | 4/2016 | Ianni et al. |
| 2016/0182415 | A1 | 6/2016 | Ames et al. |
| 2016/0203279 | A1 | 7/2016 | Srinivas et al. |
| 2016/0220878 | A1 | 8/2016 | Devathi |
| 2016/0260015 | A1 | 9/2016 | Lucey et al. |
| 2016/0375365 | A1 | 12/2016 | Thompson et al. |
| 2017/0043260 | A1 | 2/2017 | Austerlade et al. |
| 2017/0061314 | A1 | 3/2017 | Schnurr et al. |
| 2017/0072321 | A1 | 3/2017 | Thompson et al. |
| 2017/0080336 | A1 | 3/2017 | Groset et al. |
| 2017/0109015 | A1 | 4/2017 | Krasadakis |
| 2017/0132821 | A1 | 5/2017 | Valliani et al. |
| 2017/0165570 | A1 | 6/2017 | Lucey et al. |
| 2017/0235848 | A1 | 8/2017 | Van Dusen et al. |
| 2017/0238055 | A1 | 8/2017 | Chang et al. |
| 2017/0246539 | A1 | 8/2017 | Schwartz et al. |
| 2017/0255830 | A1 | 9/2017 | Chen |
| 2017/0257653 | A1 | 9/2017 | Farre Guiu et al. |
| 2017/0291093 | A1 | 10/2017 | Janssen |
| 2017/0330029 | A1 | 11/2017 | Turcot et al. |
| 2018/0032858 | A1* | 2/2018 | Lucey .................... A63F 13/25 |
| 2018/0056124 | A1* | 3/2018 | Marty ................ A63B 69/0071 |
| 2018/0084310 | A1 | 3/2018 | Katz et al. |
| 2018/0099201 | A1 | 4/2018 | Marty et al. |
| 2018/0137364 | A1 | 5/2018 | Forouhar et al. |
| 2018/0157974 | A1 | 6/2018 | Carr et al. |
| 2018/0158196 | A1 | 6/2018 | Marks |
| 2018/0204111 | A1 | 7/2018 | Zadeh et al. |
| 2018/0213033 | A1 | 7/2018 | Subbian |
| 2018/0218243 | A1* | 8/2018 | Felsen .................... G06F 18/23 |
| 2019/0087661 | A1 | 3/2019 | Lee et al. |
| 2019/0205652 | A1 | 7/2019 | Ray et al. |
| 2019/0221072 | A1 | 7/2019 | Litman |
| 2019/0224556 | A1 | 7/2019 | Ruiz et al. |
| 2019/0228290 | A1 | 7/2019 | Ruiz et al. |
| 2019/0228306 | A1 | 7/2019 | Power et al. |
| 2019/0251366 | A1 | 8/2019 | Zhong et al. |
| 2019/0374839 | A1 | 12/2019 | Wanke et al. |
| 2020/0004752 | A1 | 1/2020 | Majumdar et al. |
| 2020/0043287 | A1 | 2/2020 | Zhang et al. |
| 2020/0074181 | A1 | 3/2020 | Chang et al. |
| 2020/0170549 | A1 | 6/2020 | Baykaner et al. |
| 2020/0218902 | A1 | 7/2020 | Chang et al. |
| 2020/0230501 | A1 | 7/2020 | Schwartz et al. |
| 2020/0302181 | A1 | 9/2020 | Bhanu et al. |
| 2020/0336802 | A1* | 10/2020 | Russell ................. G06N 20/00 |
| 2020/0349611 | A1 | 11/2020 | Publicover et al. |
| 2020/0353311 | A1 | 11/2020 | Ganguly et al. |
| 2021/0056458 | A1* | 2/2021 | Savova ................. G06N 20/00 |
| 2021/0134124 | A1 | 5/2021 | Srinivasan |
| 2021/0142066 | A1* | 5/2021 | Jayaram ................. G06F 18/22 |
| 2021/0256265 | A1 | 8/2021 | Gurpinar-Morgan et al. |
| 2021/0272599 | A1* | 9/2021 | Patterson ............... G06N 3/044 |
| 2021/0304736 | A1 | 9/2021 | Kothari et al. |
| 2021/0383123 | A1 | 12/2021 | Hobbs et al. |
| 2021/0397846 | A1* | 12/2021 | Chang .................... A63F 13/60 |
| 2022/0055689 | A1 | 2/2022 | Mandlekar et al. |
| 2022/0067983 | A1 | 3/2022 | Fidler et al. |
| 2022/0253679 | A1 | 8/2022 | Power et al. |
| 2022/0270004 | A1 | 8/2022 | Ruiz et al. |
| 2022/0284311 | A1 | 9/2022 | Haynes et al. |

FOREIGN PATENT DOCUMENTS

| | | |
|---|---|---|
| KR | 10-0986647 | 10/2010 |
| WO | 2014/008134 | 1/2014 |
| WO | 2015/076682 | 5/2015 |
| WO | 2017/031356 | 2/2017 |
| WO | 2017/161167 | 9/2017 |
| WO | 2020/010040 | 1/2020 |

OTHER PUBLICATIONS

Abdullah, et al., "Intelligent Prediction of Soccer Technical Skill on Youth Soccer Player's Relative Performance Using Multivariate Analysis and Artificial Neural Network Techniques", International Journal on Advanced Science Engineering Information Technology, vol. 6, No. 5, Dec. 31, 2016, pp. 668-674.

Trainor, "Goalkeepers: How repeatable are shot saving performances?", Statsbomb, https://statsbomb.com/2014/10/goalkeepers-how-repeatable-are-shot-saving-performances/, Oct. 21, 2014.

Newton, "How Youtub Perfected The Feed", The Verge, https://www.theverge.com/2017/8/30/16222850/youtube-google-brain-algorithm-video-recommendation-personalized-feed, Aug. 30, 2017.

Covington, et al., "Deep neural networks for youtube recommendations", Proceedings of the 10th ACM conference on recommender systems, pp. 191-198, Sep. 2016.

Cheng, et al., "Wide & deep learning for recommender systems", Proceedings of the 1st workshop on deep learning for recommender systems, Sep. 2016.

Alcorn, "(batter|pitcher) 2vec: statistic-free talent modeling with neural player embeddings", MIT Sloan Sports Analytics Conference, 2018.

Wei, et al., "The thin edge of the wedge: Accurately predicting shot outcomes in tennis using style and context priors", Proceedings of the 10th Annual MIT Sloan Sport Anal Conference, Mar. 2016.

Seidl, et al., "Bhostgusters: Realtime interactive play sketching with synthesized NBA defenses", Proceeding of the 12th MIT Sloan Sports Analytics Conference, 2018.

(56) References Cited

OTHER PUBLICATIONS

Maaten, et al., "Visualizing data using t-SNE", Journal of machine learning research 9/08, pp. 2579-2605, Nov. 2008.
Felsen, et al., "Body shots: Analyzing shooting styles in the NBA using body pose", MIT Sloan, Sports Analytics Conference, Mar. 2017.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Pulling, "Long Corner Kicks In The English Premier League: Deliveries Into The Goal Ara And Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Ross, et al., "Shortcomings in the attribution process: On the origins and maintenance of erroneous social assessments", Cambridge University Press, 1982, pp. 129-152.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.
Frey, et al., "Clustering by Passing Messages Between Data Points" Science Magazine, Feb. 15, 2007, 23 pages.
Anderson, et al., "The Numbers Game: Why Everything You Know About Soccer is Wrong", 2013, Penguin Books.
Al-Shboul, et al., "Automated Player Selection for Sports Team using Competitive Neural Networks", International Journal of Advanced Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Yue, et al., "Learning Fine-Grained Spatial Models for Dynamic Sports Play Prediction", ICDM, 2014, 10 pages.
International Search Report and Written Opinion for PCT Application No. PCT/US2016/066733, dated Apr. 17, 2017, 11 pages.
Sha, et al., "Chalkboarding: A New Spatiotemporal Query Paradigm for Sports Play Retrieval", IUI, 2016, 12 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Lucey, et al., "Representing and Discovering Adversarial Team Behaviors using Player Roles," CVPR, 2013, 8 pages.
Miller, et al., "Factorized Point Process Intensities: A Spatial Analysis of Professional Basketball", ICML, Jan. 8, 2014, 13 pages.

Peng, et al., "RASL: Robust Alignment by Sparse and Low-rank Decomposition for Linearly Correlated Images", PAMI, vol. 34, No. 11, 2012, 8 pages.
Merhej, et al., "What Happened Next? Using Deep Learning to Value Defensive Actions in Football Event—Data," KDD, Aug. 2021, pp. 3394-3403.
PCT International Application No. PCT/US22/15240, International Search Report and Written Opinion of the International Searching Authority, dated May 11, 2022, 7 pages.
Blaikie, et al., "NFL & NCAA Football Prediction using Artificial Neural network," Proceedings of the Midstates Conference for Undergraduate Research in Computer Science and Mathematics, 2011, 8 pages.
Zhao, Yu, et al., "Applying deep bidirectional LSTM and mixture density network for basketball trajectory prediction," Optik, 2018, pp. 266-272.
Carney, et al., "Predicting probability distributions for surf height using an ensemble of mixture density networks," Proceedings of the 22nd international conference on Machine learning, 2005, 8 pages.
Ji, et al., "NBA All-Star lineup prediction based on neural networks," 2013 International Conference on Information Science and Cloud Computing Companion, 2013, pp. 864-869.
Pettersson, et al., "Football match prediction using deep learning," Department of Electrical Engineering, Chalmers University of Technology, 2017, 72 pages.
Pourmehr, et al., "An overview on opponent modeling in RoboCup soccer simulation 2D," Springer, 2011, pp. 402-414.
Hubácek, et al., "Lifted Relational Team Embeddings for Predictive Sports Analytics," ILP Up-and-Coming/Short Papers, 2018, 7 pages.
Sha, et al., "Fine-Grained Retrieval of Sports Plays using Tree-Based Alignment of Trajectories", arXiv preprint arXiv:1710.02255, Oct. 6, 2017, 10 pages.
Lee, et al., "Desire: Distant Future Prediction in Dynamic Scenes with Interacting Agents", Proceedings of the IEEE Conference on Computer Vision and Pattern Recognition, 2017, 10 pages.
Alahi, et al., "Social LSTM: Human Trajectory Prediction in Crowded Spaces", Proceedings of the IEEE conference on computer vision and pattern recognition, 2016, 11 pages.
Jain, et al., "Recurrent Neural Networks for Driver Activity Anticipation via Sensory-Fusion Architecture", IEEE International Conference on Robotics and Automation (ICRA), 2016, 8 pages.
Akhter, et al., "Bilinear Spatiotemporal Basis Models", ACM Transactions on Graphics, vol. 30, No. 2, Article 17, Apr. 2012, 12 pages.
Lucey, et al., "Representing and Discovering Adversarial Team Behaviors using Player Roles", Proceedings of the IEEE Conference on Computer Vision and Pattern Recognition, 2013, 8 pages.
Insafutdinov, et al., "ArtTrack: Articulated Multi-Person Tracking in the Wild", Proceedings of the IEEE Conference on Computer Vision and Pattern Recognition, 2017, 9 pages.
Le, et al., "Coordinated Multi-Agent Imitation Learning", Proceedings of the 34th International Conference on Machine Learning—vol. 70. JMLR. org, 2017, 13 pages.
Yamaguchi, et al., "Who are you with and Where are you going?", CVPR 2011. IEEE, 2011, 8 pages.
Butt, et al., "Multi-target Tracking by Lagrangian Relaxation to Min-Cost Network Flow", Proceedings of the IEEE Conference on Computer Vision and Pattern Recognition, 2013, 8 pages.
Wang, et al., "Learning Optimal Parameters For Multi-target Tracking", International journal of computer vision 122.3, 2017, 13 pages.
Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.

(56) References Cited

OTHER PUBLICATIONS

Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques For Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingman, et al., "Auto-Encoding Variational Bayes", arXiv preprint arXiv:1312.6114, May 1, 2014, 14 pages.
Gregor, et al., "DRAW: A Recurrent Neural Network For Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
Van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.
Walker, et al., "An Uncertain Future: Forecasting from Static Images using Variational Autoencoders", European Conference on Computer Vision, 2016, 17 pages.
PCT International Application No. PCT/US21/16583, International Search Report and Written Opinion of the International Searching Authority, dated Apr. 23, 2021, 11 pages.
Srinivas, et al., "A taxonomy of deep convolutional neural nets for computer vision," Frontiers in Robotics and AI 2, Jan. 11, 2016, 13 pages.
Dertat, et al., "Applied deep learning—part 4: Convolutional neural networks," Towards Data Science 26, https://towardsdatascience.com/applied-deep-learning-part-4-convolutional-neural-networks-584bc134c1e2, Nov. 8, 2017, 26 pages.
Edge AI and Vision Alliance, "Using Cconvolutional Neural Networks fo Image Recognition," https://www.edge-ai-vision.com/2015/11/using-convolutional-neural-networks-for-image-recognition/, Nov. 12, 2015, 20 pages.
Machine Learning Notebook, "Convolutional Neural Networks—Basics," https://mlnotebook.github.io/post/CNN1/, Apr. 7, 2017, 13 pages.
Knauf, et al., "Spatio-temporal convolution kernels," Machine learning 102.2, Jul. 2015, 28 pages.
Chandler, et al., "An exploratory study of minor league baseball statistics," Journal of Quantitative Analysis in Sports 8.4, 2012, 37 pages.
Perricone, et al., "Predicting Results for Professional Basketball Using NBA API Data," 2016, 6 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Wang, et al., "Classifying NBA offensive plays using neural networks," Proceedings of MIT Sloan Sports Analytics Conference, vol. 4, 2016, 9 pages.
Zhao, "Research and Application of Online Learning of Formation Strategy Based on Neural Network Information Technology Collection of China Masters' Dissertations Full Text Database," No. 2, 2014, pp. 38-40.
Wei, "Modelling and predicting adversarial behaviour using large amounts of spatiotemporal data." Diss. Queensland University of Technology, 2016, 167 pages.
Liang, et al., "Dual motion GAN for future-flow embedded video prediction," proceedings of the IEEE international conference on computer vision, 2017, 9 pages.
Mehrotra, "Elements of artifical neural networks," MIT Press, 1997.
Arabzad, et al., "Football match results prediction using artificial neural networks; the case of Iran Pro League," Journal of Applied Research on Industrial Engineering 1.3, Oct. 9, 2014, pp. 159-179.
PCT International Application No. PCT/US19/14614, International Search Report and Written Opinion of the International Searching Authority, dated Apr. 16, 2019, 9 pages.
PCT International Application No. PCT/US19/14608, International Search Report and Written Opinion of the International Searching Authority, dated Apr. 15, 2019, 12 pages.
Acuna, "Unsupervised modeling of the movement of basketball players using a deep generative model," 31st Conference on Neural Information Processing Systems, 2017, 11 pages.
Felsen, et al., "Where will they go? predicting fine-grained adversarial multi-agent motion using conditional variational autoencoders," Proceedings of the European conference on computer vision (ECCV), 2018, pp. 761-776.
Nakashima, et al., "Off-line learning of soccer formations from game logs," 2010 World Automation Congress, 2010, 6 pages.
Janetzko, et al., "Feature-driven visual analytics of soccer data," 2014 IEEE conference on visual analytics science and technology (VAST), Nov. 2014, pp. 13-22.
Wagenaar, "Predicting Goal-Scoring Opportunities in Soccer by Using Deep Convolutional Neural Networks," Department of Artificial Intelligence, University of Groningen, Nov. 16, 2016, 65 pages.
Abreu, et al., "Improving a simulated soccer team's performance through a Memory-Based Collaborative Filtering approach," Applied Soft Computing 23, 2014, pp. 180-193.
McCabe, et al., "Artificial intelligence in sports prediction," Fifth International Conference on Information Technology: New Generations, IEEE Computer Society, Apr. 9, 2008, 4 pages.
Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.
Preferred Networks, Inc., "Football Analytics using Deep Learning," YouTube, https://www.youtube.com/watch?v=hs_v3dv6OUI, Jul. 25, 2019, 3 pages.
Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.
Cervone, et al., "A multiresolution stochastic process model for predicting basketball possession outcomes," Journal of the American Statistical Association 111.514, 2016, pp. 585-599.
Ruiz, et al., "The Leicester City Fairytale?" Utilizing New Soccer Analytics Tools to Compare Performance in the 15/16 & 16/17 EPL Seasons, Proceedings of the 23rd ACM SIGKDD International Conference on Knowledge Discovery and Data Mining, 2017, 13 pages.
Gyarmati, et al., "Searching for a unique style in soccer," arXiv preprint arXiv:1409.0308, 2014, 4 pages.
PCT International Application No. PCT/US21/53117, International Search Report and Written Opinion of the International Searching Authority, dated Jan. 14, 2022, 9 pages.
Wei, et al., "Predicting serves in tennis using style priors," Proceedings of the 21th ACM SIGKDD International Conference on Knowledge Discovery and Data Mining, 2015, 9 pages.
Maher, "Modelling Association Football Scores", Statistics Neerlandica 36, nr.3, Published 1982, pp. 109-118.

(56) References Cited

OTHER PUBLICATIONS

Dixon, et al., "Modelling Association Football Scores and Inefficiencies in the Football Betting Market", Appl Statist 46. No 2, Published 1997, pp. 265-280.
Koopman, et al., "A dynamic bivariate Poisson model for analysing and forecasting match results in the English Premier League", Dated Sep. 24, 2012, 30 pages.
Boshnakov, et al., "A Bivariate Weibull Count Model For Forecasting Association Football Scores", Dated Sep. 9, 2016, 13 pages.
Boice, "How Our Club Soccer Projections Work", FiveThirtyEight, https://fivethirtyeight.com/features/how-our-club-soccer-projections-work/, Dated Jan. 19, 2017, 6 pages.
Goddard, et al., "Modelling football match results and the efficiency of fixed-odds betting", Published 2004, 27 pages.
Huang, et al., "A Neural Network Method for Prediction of 2006 World Cup Football game", Published 2010 IEEE, 8 pages.
Kharrat, et al., "Plus-Minus Player Ratings for Soccer", arXiv:1706.04943v1, Dated Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, Dated May 15, 2017, 4 pages.
Beuoy, "Updated NBA Win Probability Calculator", InPredictable, http://www.inpredictable.com/2015/02/updated-nba-win-probability-calculator.html, Dated Feb. 6, 2015, 4 pages.
Asif, et al., "In-Play forecasting of win probability in One-Day International cricket: A dynamic logistic regression model", International Journal of Forecasting 32, Published 2016, pp. 34-43.
Pelechrinis, "iWinRNFL: A Simple, Interpretable & Well-Calibrated In-Game Win Probability Model for NFL", arXiv:1704.00197v3, Dated Mar. 14, 2018, 7 pages.
Lock, et al., "Using random forests to estimate win probability before each play of an NFL game", JQAS 2014; 10(2); Published 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.
Bishop, "Mixture Density Networks", Neural Computing Research Group Report, NCRG/94/004, Dated Feb. 1994, 26 pages.
Kingma, et al., "Adam: A Method for Stochastic Optimization", arXiv:1412.6980v9, ICLR 2015, Dated Jan. 30, 2017, 15 pages.
Paine, "The Pats' Comeback Was Incredible—Even If You Think The Falcons Blew It", FiveThirtyEight, https://fivethirtyeight.com/features/patriots-falcons-comeback-super-bowl/, Dated Feb. 6, 2017, 4 pages.
Deerwester, et al., "Indexing by Latent semantic Analysis", Published 1990, 34 pages.
Blei, et al., "Latent Dirichlet Allocation", Journal of Machine Learning Research 3, Published 2003, pp. 993-1022.
Bengio, et al., "A Neural Probabilistic Language Model", Journal of Machine Learning Research 3, Published 2003, pp. 1137-1155.
Mikolov, et al., "Efficient Estimation of Word Representations in Vector Space", arXiv:1301.3781v3, Dated Sep. 7, 2013, 12 pages.
Mikolov, et al., "Distributed Representations of Words and Phrases and their Compositionality", Published 2013, 9 pages.
Ho, "Random Decision Forests", Published 1995 IEEE, pp. 278-282.
Van den Oord, et al., "WaveNet: A Generative Model For Raw Audio", arXiv:1609.03499v2, Dated Sep. 19, 2016, 15 pages.
Chung, et al., "Hierarchical Multiscale Recurrent Neural Networks", ICLR 2017, arXiv:1609.01704v7, Dated Mar. 9, 2017, 13 pages.
Graves, "Generating Sequences with Recurrent Neural Networks", arXiv:1308.0850v5, Dated Jun. 5, 2014, 43 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.
Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, Scitepress, 2017, 8 pages.
Stein, et al. "Bring it to the pitch: Combining video and movement data to enhance team sport analysis," IEEE transactions on visualization and computer graphics 24.1,2017,, pp. 13-22.

* cited by examiner

PERSONALIZING PREDICTION OF PERFORMANCE USING DATA AND BODY-POSE FOR ANALYSIS OF SPORTING PERFORMANCE

CROSS-REFERENCE TO RELATED APPLICATIONS

This application claims priority to U.S. Application Ser. No. 62/812,387, filed Mar. 1, 2019, which is hereby incorporated by reference in its entirety.

FIELD OF THE DISCLOSURE

The present disclosure generally relates to system and method for generating personalized prediction of sporting performance based on, for example, data.

BACKGROUND

Increasingly, sports fans and data analysts have become entrenched in sports analytics, particularly in trying to determine whether the outcome of a match or game instance would change based on a change to the players in the match. For example, typical "Monday Morning Quarterback" sportscasters argue over how the outcome of a match could have changed if, for example, the coach made one or more roster adjustments. Accordingly, there is a continual competition for developing a system that can more accurately predict an outcome a game instance.

SUMMARY

Embodiments disclosed herein generally relate to a system and method for generating shot predictions. In another embodiment, a method of generating a player prediction is disclosed herein. A computing system retrieves data from a data store. The data includes information for a plurality of events across a plurality of seasons. The computing system generates a predictive model using an artificial neural network. The artificial neural network generates one or more personalized embeddings that include player-specific information based on historical performance. The computing system selects, from the data, one or more features related to each shot attempt captured in the data. The artificial neural network learns an outcome of each shot attempt based at least on the one or more personalized embeddings and the one or more features related to each shot attempt. The computing system receives a set of data directed to a target shot attempt. The set of data includes at least the player involved in the target shot attempt and one or more features related to the target shot attempt. The computing system generates, via the predictive model, a likely outcome of the shot attempt based on personalized embeddings of the player involved in the target shot attempt and the one or more features related to the target shot attempt.

In some embodiments, a system for generating a player prediction is disclosed herein. The system includes a processor and a memory. The memory has programming instructions stored thereon, which, when executed by the processor, performs one or more operations. The one or more operations include retrieving data from a data store. The data includes information for a plurality of events across a plurality of seasons. The one or more operations further include generating a predictive model using an artificial neural network by generating, by the artificial neural network, selecting, from the data, one or more features related to each shot attempt captured in the data, and learning, by the artificial neural network, an outcome of each shot attempt based at least on the one or more personalized embeddings and the one or more features related to each shot attempt. The one or more personalized embeddings include player-specific information based on historical performance. The one or more operations further include receiving a set of data directed to a target shot attempt. The set of data includes at least the player involved in the target shot attempt and one or more features related to the target shot attempt. The one or more operations further include generating, via the predictive model, a likely outcome of the shot attempt based on personalized embeddings of the player involved in the target shot attempt and the one or more features related to the target shot attempt.

In another embodiment, a non-transitory computer readable medium is disclosed herein. The non-transitory computer readable medium includes one or more sequences of instructions that, when executed by the one or more processors cause a computing system to perform one or more operations. The computing system retrieves data from a data store. The data includes information for a plurality of events across a plurality of seasons. The computing system generates a predictive model using an artificial neural network. The artificial neural network generates one or more personalized embeddings that include player-specific information based on historical performance. The computing system selects, from the data, one or more features related to each shot attempt captured in the data. The artificial neural network learns an outcome of each shot attempt based at least on the one or more personalized embeddings and the one or more features related to each shot attempt. The computing system receives a set of data directed to a target shot attempt. The set of data includes at least the player involved in the target shot attempt and one or more features related to the target shot attempt. The computing system generates, via the predictive model, a likely outcome of the shot attempt based on personalized embeddings of the player involved in the target shot attempt and the one or more features related to the target shot attempt.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
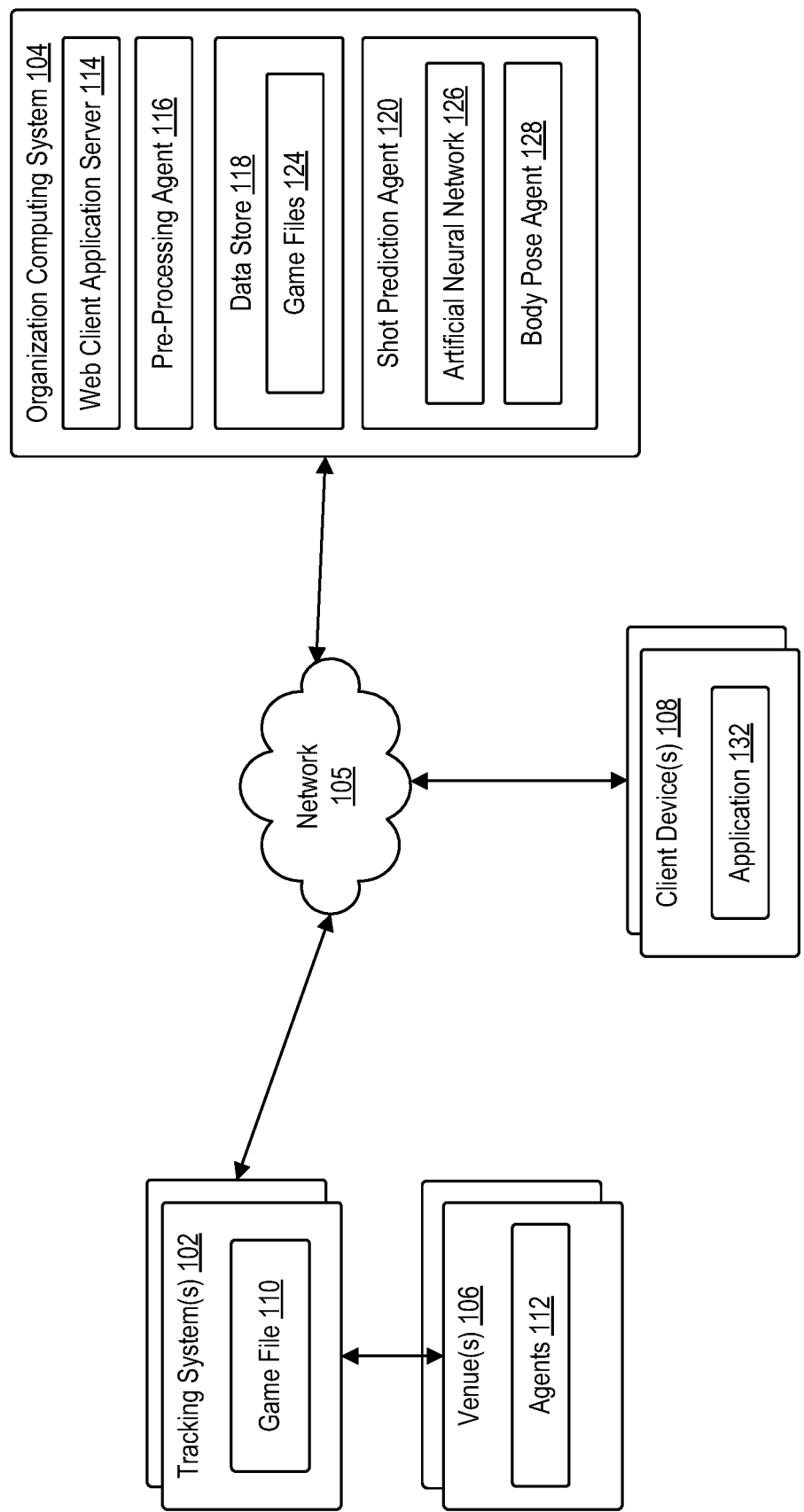
FIG. 1 is a block diagram illustrating a computing environment, according to example embodiments.

One or more techniques disclosed herein generally relate to a system and a method for generating a goalkeeper prediction. In other words, one or more techniques disclosed herein relate to a system and method for predicting the likelihood a goalkeeper would concede or block a shot attempt based on, for example, one or more shot parameters and personalized information about the goalkeeper.

Late in the 2018 Champions League Final between Real Madrid and Liverpool, with the score 2-1 in favor of Real Madrid, Real Madrid's player, Gareth Bale, took aim at Liverpool goalkeeper Loris Karius from 35 yards away with a powerful, yet straight, shot. The ball ended up sailing through Karius' hands, effectively giving Real Madrid their third straight title. The reaction to the loss was immediate by Liverpool, with the club breaking the world record for a goalkeeper by purchasing Brazilian Alisson for £67 million from AS Roma.

While this transfer triggered a flurry of other high-priced goalkeeper transfers between the top European leagues, putting the cost of goalkeepers at an all-time high, it begs the questions: 1) how can one compare the performance of different goalkeepers across teams and leagues?; and 2) how can one approximate whether or not a goalkeeper will be a success on a specific team?

Conventional approaches assess goalkeepers using coarse metrics, such as "clean-sheets," "total goals conceded," or "shots saved to goals conceded" ratio. More recently, conventional systems implement "expected metrics," such as expected saves (xS) to compare goalkeeper performance to league average. Problems arise with these methods, however, because goalkeepers may have different types of saves to make depending on the style of the team and the opponents they face.

Instead of using metrics, which may not capture all the different situations and contexts, the one or more techniques disclosed herein go beyond metrics, by simulating each goalkeeper for every shot, and comparing who would concede the most goals. For example, the one or more techniques disclosed herein may provide an answer to the question: If Alisson played for Liverpool last year, how many goals would he have saved/conceded based on the shots that Liverpool faced during the season?

Even though the concept may seem simple on its face, the process of accurately simulating the swapping of different goalkeepers for specific situations is challenging due to several factors, such as, but not limited to:

The lack of specific examples for each goalkeeper: such task would be easier if the goalkeeper faced, for example, one million shots per season. However, given that each goalkeeper, on average, faces two to five shots on target per game (around 70-150 shots on target per season for a 38 game season), a goal keeper may only face a couple of shots per location/context, or may not at all be based on whom they play for. For example, a goalkeeper who plays for a team that generally sits back deeply defensively may not face many counter-attacking shots, or another goalkeeper who plays on a team who is very strong on set-pieces, may not actually face many shots from set-pieces.

The changing form of a goalkeeper: due to injury, fatigue, age, confidence, improvements in skill, coaching, etc., a goalkeeper's form may change across the course of a season and/or career. Such change may result in previous examples of goalkeeper saves being no longer relevant (i.e., examples may not be predictive of current or future performance).

The data is not granular enough: the observation for each shot may only be restricted to x, y position of the host location, the x, y goalkeeper location at the time of the strike, the x, y final ball position (with the associated player identities). To more accurately predict the likelihood of a goalkeepers saving a shot, body pose position (i.e., whether they crouched, stood up straight/unbalanced, arms wide, striker body pose, etc.), may be useful for such analysis.

To address such challenges, the one or more techniques described herein utilize a personalized prediction approach using dynamic spatial features within a deep learning framework. In particular, the technique described herein may employ a feed forward neural network with a combination of fixed (e.g., shot and goalkeeper locations) and dynamically updated (e.g., player form, time in game, scoreline, etc.) embeddings and features to predict the chance of a shot being saved (e.g., expected saves), where a shot will be placed, and critically allow the interface between goalkeepers to compare performance in the same situations.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to record the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x, y) position) for all agents and objects on the playing surface for each frame in a game file 110.

Game file 110 may be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102. Organization computing system 104 may include at least a web client application server 114, a pre-processing engine 116, a data store 118, and scoring prediction agent 120. Each of pre-processing engine 116 and shot prediction engine 120 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include spatial event data and non-spatial event data. For example, spatial event data may correspond to raw data captured from a particular game or event by tracking system 102. Non-spatial event data may correspond to one or more variables describing the events occurring in a particular match without associated spatial information. For example, non-spatial event data may include each shot attempt in a particular match. In some embodiments, non-spatial event data may be derived from spatial event data. For example, pre-processing engine 116 may be configured to parse the spatial event data to derive shot attempt information. In some embodiments, non-spatial event data may be derived independently from spatial event data. For example, an administrator or entity associated with organization computing system may analyze each match to generate such non-spatial event data. As such, for purposes of this application, event data may correspond to spatial event data and non-spatial event data.

In some embodiments, each game file 124 may further include the current score at each time, t, during the match, the venue at which the match is played, the roster of each team, the minutes played by each team, and the stats associated with each team and each player.

Pre-processing agent 116 may be configured to process data retrieved from data store 118. For example, pre-processing agent 116 may be configured to generate one or more sets of information that may be used to train one or more neural networks associated with scoring prediction agent 120. Pre-processing agent 116 may scan each of the one or more game files stored in data store 118 to identify one or more statistics corresponding to each specified data set, and generate each data set accordingly. For example, pre-processing agent 116 may scan each of the one or more game files in data store 118 to identify one or more shots attempted in each game, and identify one or more coordinates associated therewith (e.g., shot start coordinates, end location coordinates, goalkeepers start position coordinates, etc.).

Scoring prediction agent 120 may be configured to generate "personalized predictions" for the outcome of a particular scoring event. In some embodiments, a sporting event may be defined as a scoring attempt during the course of a sporting event. Exemplary scoring events may include, but are not limited to, basketball shot attempt, free-throw attempt, touchdown pass attempt, touchdown rush attempt, field-goal attempt, hockey shot attempt, hockey penalty shot attempt, baseball at-bat, soccer shot attempt, soccer penalty kick attempt, golf putt attempt, golf swing attempt, and the like. Although the below discussion focuses on a particular example related to soccer, those skilled in the art may readily understand that such operations may be extended to one or more scoring events in any type of sporting event. In some embodiments, scoring prediction agent 120 may be configured to generate a predicted outcome of a shot based on at least one or more of shot start position (x, y), shot end location (x, y, z), goalkeeper start position (x, y), time in game, half, score, venue, player identities (e.g., goalkeeper identities), one or more handcrafted geometric features, and body pose information. Accordingly, scoring prediction agent 120 may generate the predicted outcome of a shot based on one or more fixed variables and one or more dynamically updated embeddings and features to predict the chance of a shot being saved, where a shot may be placed, and the like. In some embodiments, scoring prediction agent 120 may be configured to critically allow for the interchange of goalkeepers to compare performance, if given the same situation (i.e., same shot attempt). Still further, in some embodiments, scoring prediction agent 120 may be configured to allow for the analysis of a given goalkeeper across the goalkeeper's career.

Scoring prediction agent 120 may include artificial neural network 126 and body pose agent 128. Artificial neural network 126 may be configured to predict whether a given shot will be successfully defended (i.e., no goal) or unsuccessfully defended (i.e., goal) which agents are in an event (e.g., on the court) at a given time. For example, neural network module 220 may be configured to learn how to predict an outcome of a given shot based on, for example, one or more of shot start position (x, y), shot end location (x, y, z), goalkeeper start position (x, y), time in game, half, score, venue, player identities (e.g., goalkeeper identities), one or more handcrafted geometric features, and body pose information.

Body pose agent 128 may be configured to generate one or more metrics related to the body pose of at least one or more of a goalkeeper and a shooter for a given shot. In some embodiments, body pose agent 128 may generate body pose information based on event data captured by tracking system 102. In some embodiments, body-post agent 128 may generate body pose information from a broadcast stream provided by a broadcast provider. Body-post agent 128 may be able to identify, for example, shooter start position and angle, run type (e.g., stutter and speed), shot initiation (e.g., body lean angle, upper body angle, hip orientation, kicking arm position, shoulder alignment, etc.), and the like. Additionally, the raw positions of the body-positions in 2D or 3D which appear as a skeleton can be used to detect and correlate specific key actions in sports.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 126. Application 126 may be representative of a web browser that allows access to a website or a stand-alone application. Client device 108 may access application 126 to access one or more functionalities of organization computing system 104. Client device 108 may communicate over network 105 to request a webpage, for example, from web client application server 114 of organization computing system 104. For example, client device 108 may be configured to execute application 126 to access content managed by web client application server 114. The content that is displayed to client device 108 may be transmitted from web client application server 114 to client device 108, and subsequently processed by application 126 for display through a graphical user interface (GUI) of client device 108.

Figure 2:
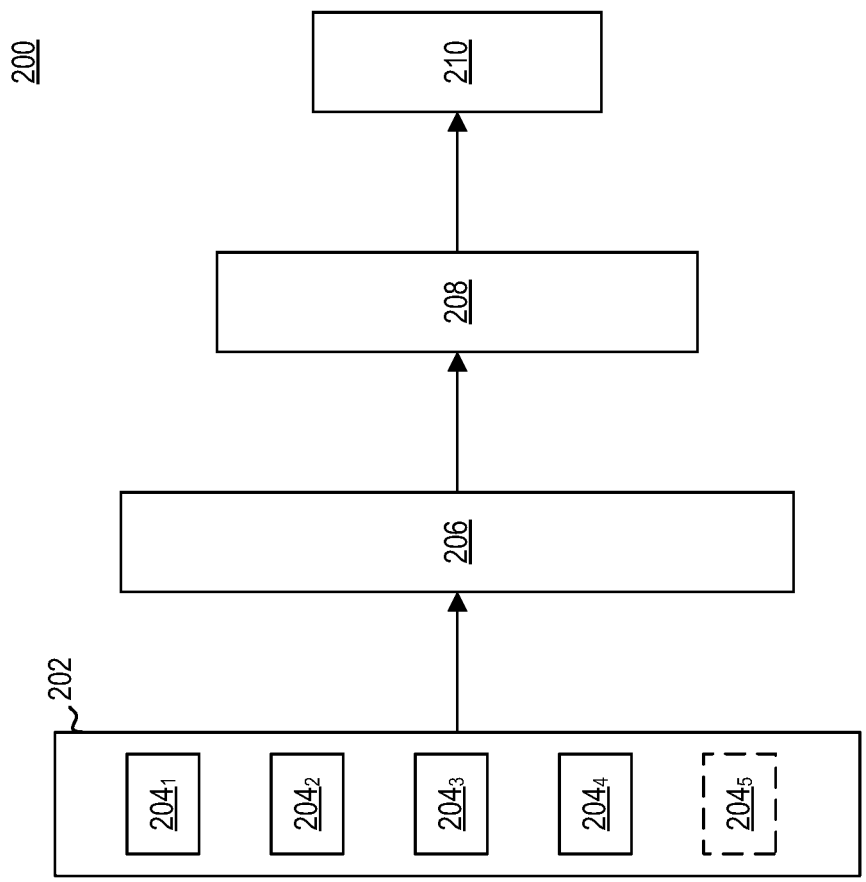
FIG. 2 is a block diagram illustrating a structure of an artificial neural network, according to example embodiments.

FIG. 2 is a block diagram illustrating artificial neural network (ANN) structure 200, according to example embodiments. ANN structure 200 may represent artificial neural network 126.

ANN structure 200 may represent a four-layer feed forward neural network. As illustrated, ANN structure 200 may include input layer 202, first hidden layer 206, second hidden layer 208, and an output layer 210.

Input layer 202 may be representative of one or more inputs $204_1$-$204_5$ (generally, "inputs 204") provided to artificial neural network 126. For example, input $204_1$ may be directed to shot start locations, input $204_2$ may correspond to goalkeeper locations, input $204_3$ may correspond to scores, times, and shot end locations, input $204_4$ may correspond to dynamic goalkeeper embeddings, and input $204_5$ may correspond to body pose information.

In some embodiments, to train and test artificial network 126, the one or more inputs 204 in input layer 202 may be selected from three seasons worth of data (e.g., 2016-2018) from 54 different leagues/competitions across the world with a sample of about 150,000 (e.g., 45,000 goals, 105,000 saves) shots on target faced by over 2000 goalkeepers. The information may be split into training sets and test sets (e.g., 80%/20%, respectively).

First hidden layer 206 may be of size 12. For example, first hidden layer $206 \in \mathbb{R}^{12}$. First hidden layer 206 may use rectified linear unit (ReLu) activation function. Second hidden layer 208 may be of size 8. For example, second hidden layer $208 \in \mathbb{R}^{8}$. Second hidden layer 208 may be implemented with ReLu activation function.

Output layer 208 may be configured to generate an output prediction. For example, output layer 208 may be configured to output "goal" or "save" as possible options for each respective shot. Output layer 208 may be implemented with sigmoid activation function.

Figure 3:
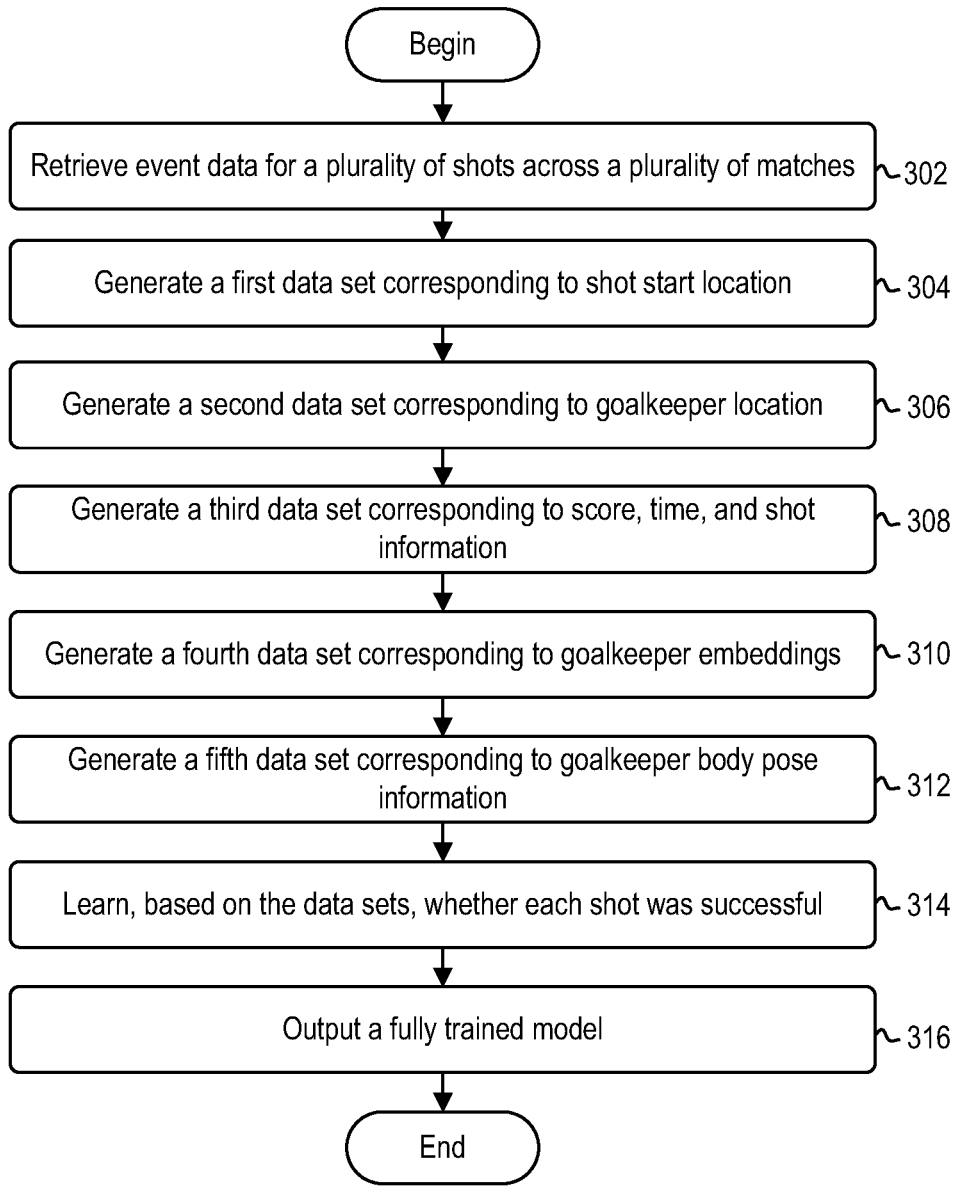
FIG. 3 is a flow diagram illustrating a method of generating a fully trained prediction model, according to example embodiments.

FIG. 3 is a flow diagram illustrating a method 300 of generating a fully trained prediction model, according to example embodiments. Method 300 may begin at step 302.

At step 302, scoring prediction agent 120 may retrieve event data for a plurality of scoring attempts (e.g., shot attempts in soccer) across a plurality of matches. For example, scoring prediction agent 120 may retrieve spatial event data from data store 118. Spatial event data may capture every touch of the ball, with x, y coordinates and time stamps, as well as non-spatial event data, i.e., one or more variables describing one or more events without associated spatial information. In some embodiments, pre-processing agent 112 may be configured to parse through the retrieved event data to identify one or more portions of event data that include shot attempts. For example, pre-processing agent 112 may extract one or more portions from the event data, such that only event data corresponding to shot attempts are included therein.

At step 304, scoring prediction agent 120 may generate a first data set corresponding to a scoring attempt start location. For example, scoring prediction agent 120 may parse through the one or more sets of event data retrieved from data store 118 to identify shot start location for each shot identified therein. In some embodiments, shot start location information may include x, y data coordinates. In some embodiments, shot start location information may include x, y, z data coordinates. For example, additional contextual features such as, but not limited to, a headed shot, or left or right foot on the ground or the air (e.g., volley).

At step 306, scoring prediction agent 120 may generate a second data set corresponding to player location. For example, scoring prediction agent 120 may parse through the one or more sets of event data retrieved from data store 118 to identify goalkeeper location corresponding to each shot identified therein. In some embodiments, scoring prediction agent 120 may correlate the identified goalkeeper location to a respective starting shot location.

At step 308, scoring prediction agent 120 may generate a third data set corresponding to score, time, and shot information. For example, scoring prediction agent 120 may parse through the one or more sets of event data retrieved from data store 118 to identify, for each shot, a time at which the shot was taken, a score when the shot was taken, a half wat which the shot was taken, the venue in which the shot was taken, and one or more geometric features. Such geometric features may include, but are not limited to, striker and goalkeeper angle and distance to the center of the goal and each other.

At step 310, scoring prediction agent 120 may generate a fourth data set corresponding to one or more player embeddings. For example, one or more goalkeeper embeddings may transform the learning process from learning the habits of a generic, average goalkeeper, to learning habits of each specified goalkeeper. In other words, to make the predictions more personalized, scoring prediction agent 120 may capture the identity of the goalkeeper for each shot. For each goalkeeper, scoring prediction agent 120 may be configured to generate a spatial descriptor of the goalkeeper, thus capturing the influence of the goalkeeper on the shot outcome. Such spatial descriptor may contain a large amount of information about a goalkeeper's strength and weaknesses. For example, one or more spatial descriptors may include, but are not limited to: clean sheet percentage, win percentage, save percentage for shots ending in the middle, left, and right thirds of the goal, save percentage of shots that are struck directly at them, to the right, or to the left of the goalkeeper, and the like. These spatial descriptors may be dynamic in nature. As such, the spatial descriptors may be generated on a season-level and an x-game rolling window average (e.g., 10-game) to capture hot and cold streaks of keepers.

In some embodiments, method 300 may further include step 312. At step 312, scoring prediction agent 120 may generate a fifth data set corresponding to player body pose information. For example, body pose agent 128 may be configured to generate body pose information for each striker and goalkeeper pair in the event data.

Generally, a penalty kick may be considered the most controlled scoring situation in European football. Penalty kicks typically favor the striker, with only 30% of penalty kicks being saved by the goalkeeper. To be able to determine what differentiates goalkeepers from each other, in some embodiments, scoring prediction agent 120 may go beyond event data to use more fine-grain body pose data. Such body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 314, scoring prediction agent 120 may be configured to learn, based on the data sets, whether each scoring attempt was successful. For example, scoring prediction agent 120 may be configured to train artificial neural network 126, using the first through fifth data sets, to predict whether a goalkeeper will block or allow a shot. Because scoring prediction agent 120 takes into consideration the one or more goalkeeper embeddings, scoring prediction agent 120 may be configured to train artificial neural network 126 on a more granular basis. For example, rather than providing a determination based on that of an average goalkeeper, artificial neural network 126 may be trained to output a different prediction based on one or more spatial descriptors of the given goalkeeper.

At step 316, scoring prediction agent 120 may output a fully trained model. For example, scoring prediction agent 120 may output a fully trained model that is configured to receive shot attempt information and determine whether a particular goalkeeper will concede or block the shot attempt.

Figure 4:
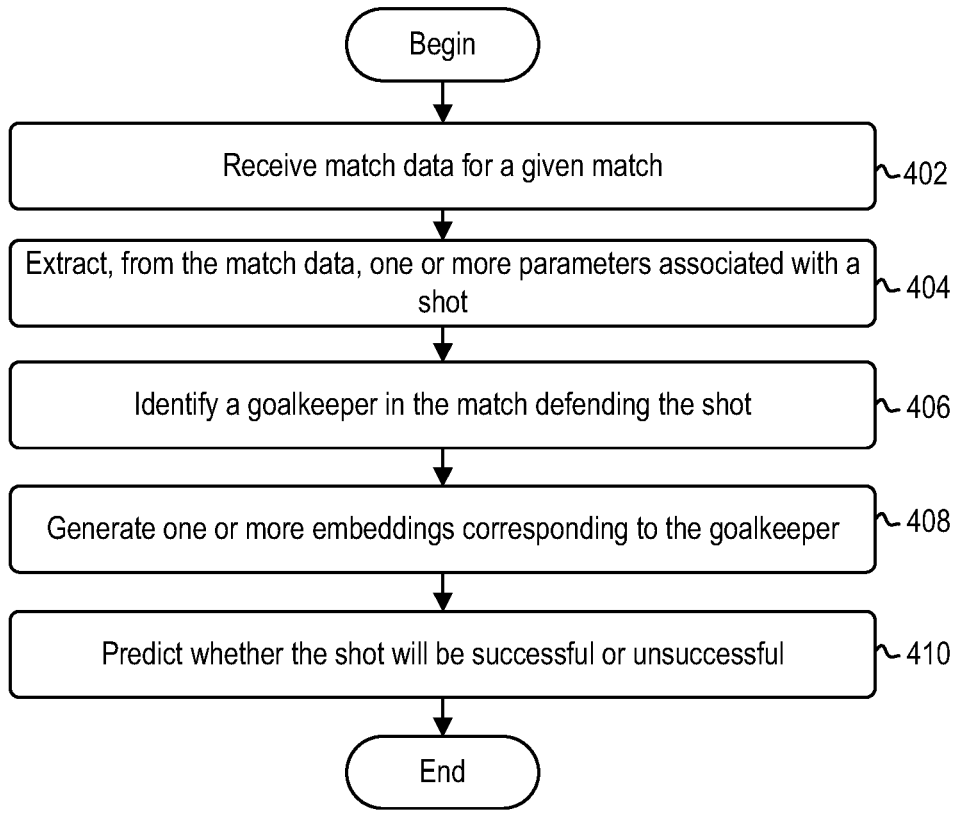
FIG. 4 is a flow diagram illustrating a method of generating a shot prediction using the fully trained prediction model, according to example embodiments.

FIG. 4 is a flow diagram illustrating a method 400 of generating a shot prediction using the fully trained prediction model, according to example embodiments. Method 400 may begin at step 402.

At step 402, scoring prediction agent 120 may receive match data for a given match. For example, scoring prediction agent 120 may receive a pre-shot information for a shot attempt at a particular goalkeeper. In some embodiments, scoring prediction agent 120 may receive match data from tracking system 102. In some embodiments, scoring prediction agent 120 may receive match data from client device 108. For example, a user, via application 132, may request that a prediction be made for a given shot in a given match.

At step 404, scoring prediction agent 120 may extract, from the match data, one or more parameters associated with a shot. For example, scoring prediction agent 120 may be configured to generate one or more input values for artificial neural network 126 by selectively extracting one or more parameters associated with the shot. In some embodiments, the one or more parameters may include, but are not limited to, one or more of: shot location (x, y) coordinates, goalkeeper location (x, y, z) coordinates, current time of the game, current score of the game, venue, one or more handcrafted geometric features, shooter start position and angle run type (e.g., stutter and speed), and the like.

At step 406, scoring prediction agent 120 may identify a goalkeeper that is defending the shot. For example, scoring prediction agent 120 may parse the match data for the given match and identify the particular goalkeeper defending the shot received from the striker.

At step 408, scoring prediction agent 120 may generate identity value for the goalkeeper. In some embodiments, scoring prediction agent 120 may generate the identity value for the goalkeeper based on one or more embeddings generated during the training/testing phase of artificial neural network 126. For example, scoring prediction agent 120 may utilize the same or similar spatial descriptor of the goalkeeper that was used during the training/testing phase. This may allow artificial neural network to identify the particular goalkeeper.

At step 410, scoring prediction agent 120 may predict whether the shot attempt will be successful or unsuccessful. In other words, scoring prediction agent 120 may predict whether the goalkeeper will concede a goal or block the shot attempt. Scoring prediction agent 120 may predict the result of the shot attempt using artificial neural network 126. For example, scoring prediction agent 120 may provide, as input, to artificial neural network 126 the extracted one or more parameters associated with the shot attempt and identity information of the goal keeper. Scoring prediction agent 120 may generate, as output, a predicted outcome of the shot attempt (i.e., goal or no goal).

Figure 5A:
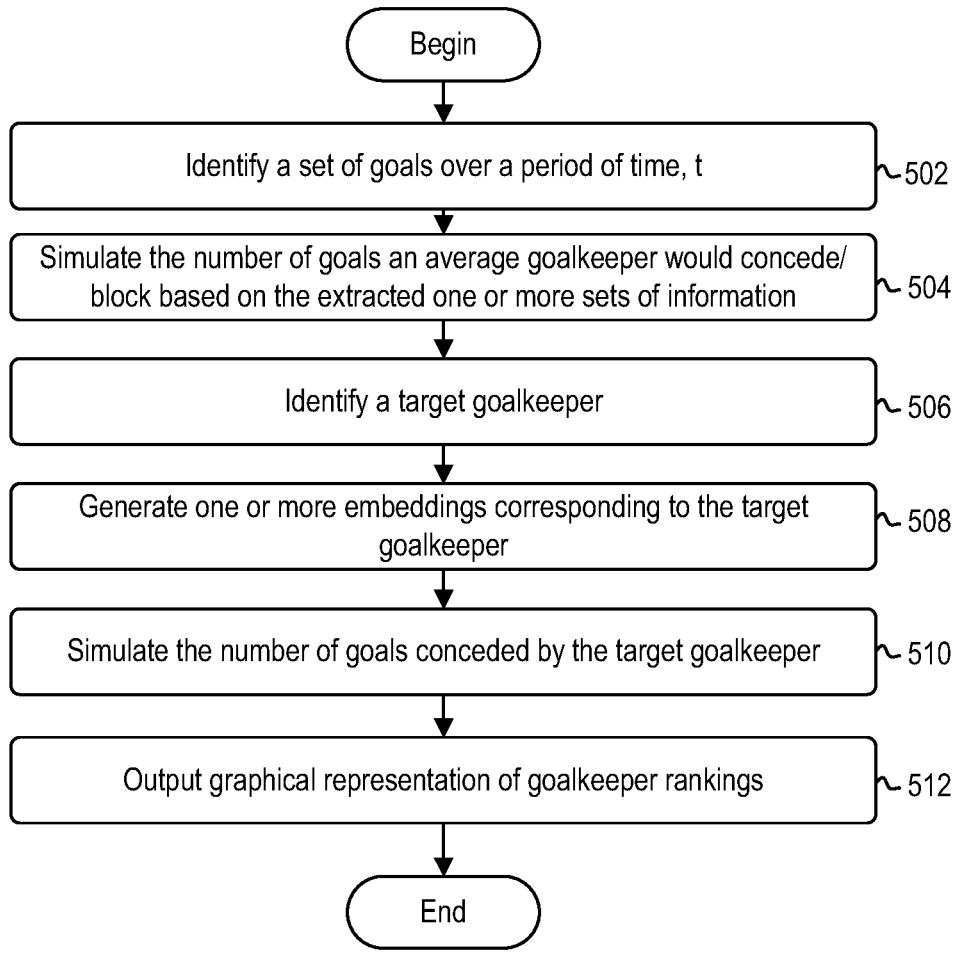
FIG. 5A is a flow diagram illustrating a method of generating player rankings based on a number of simulated goals conceded, according to example embodiments.

FIG. 5A is a flow diagram illustrating a method 500 of generating goalkeeper rankings based on a number of simulated goals conceded, according to example embodiments. Method 500 may begin at step 502.

At step 502, scoring prediction agent 120 may identify a set of goals over some time, t. For example, scoring prediction agent 120 may receive, from client device 108 via application 132, a request to generate a ranking of goal keeps across some period, t. In some embodiments, t may be representative of several matches, a full season, multiple seasons, and the like. In some embodiments, a user may constrain the request to a specific league (e.g., English Premier League, MLS, Bundesliga, etc.).

At step 504, scoring prediction agent 120 may simulate a number of goals an average goalkeeper would concede/block based on the identified set of goals, during the time t. For example, scoring prediction agent 120 may identify one or more parameters associated with each shot. Such parameters may include, but are not limited to, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 506, scoring prediction agent 120 may identify a target goalkeeper. In some embodiments, scoring prediction agent 120 may iterate through all available goalkeepers across all leagues. In some embodiments, scoring prediction agent 120 may iterate through all available goalkeepers that defended a threshold number of goals defended (e.g., at least 60). In some embodiments, a user may specify, via application 132, a set of goalkeepers to rank.

At step 508, scoring prediction agent 120 may generate one or more embeddings of the target goalkeeper. For example, scoring prediction agent 120 may inject personalized descriptor of the goalkeeper into the extracted parameters. In some embodiments, scoring prediction agent 120 may iteratively inject one or more embeddings of each goalkeeper for the analysis into the extracted parameters. By injecting the one or more personalized embeddings into the data set used to simulate the number of goals for an average keeper, scoring prediction agent 120 may generate a data set that may be used to analyze each goalkeeper's performance in relation to the average goalkeeper.

At step 510, scoring prediction agent 120 may simulate a number of goals a target goalkeeper would concede/block based on the identified set of goals during the time, t, and the one or more embeddings of the target goal keeper. For example, scoring prediction agent 120 may simulate the number of goals based on the personalized descriptor of the goalkeeper, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like. In other words, scoring prediction agent 120 may utilize the same parameters used in step 506 above, as well as the one or more embeddings.

At step 512, scoring prediction agent 120 may output a graphical representation of goalkeeper rankings. The one or more goalkeepers may be ranked based on the number of goals blocked/conceded in relation to the average goalkeeper. In some embodiments, this may be determined by subtracting the output generated in step 508 from the output generated in step 504. For example, for each goalkeeper scoring prediction agent 120 may subject the output generated in step 512 (i.e., the goalkeeper specific output) from the output generated in step 506 (i.e., the average goal keeper output) to generate a goal+/−value. In some embodiments, the graphical representation may be a list, ranking each goalkeeper. In some embodiments, the graphical representation may be a chart ranking each goal keeper. An exemplary graphical representation is discussed below in conjunction with FIG. 5B.

Figure 5B:
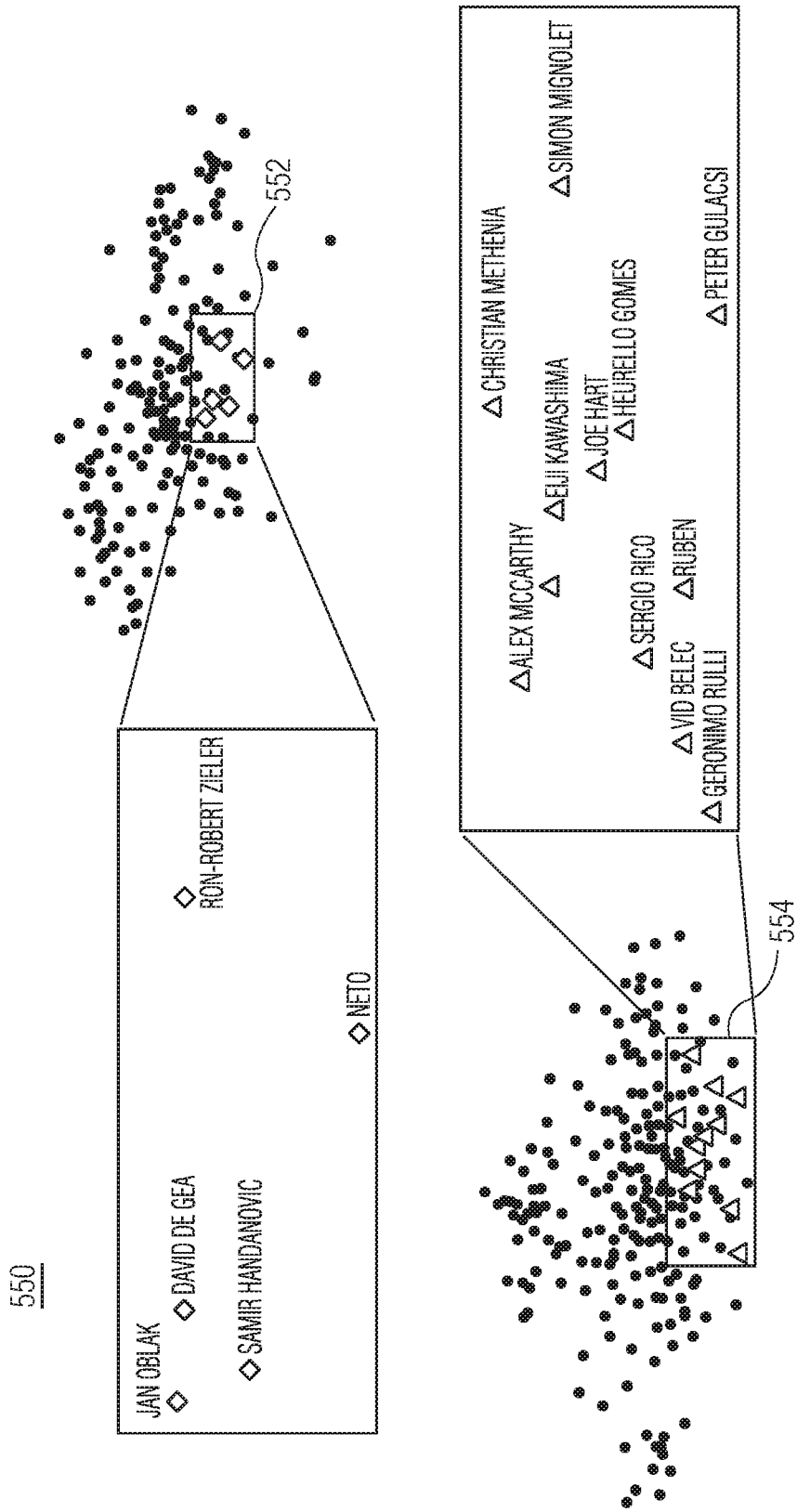
FIG. 5B is a block diagram of a graphical user interface illustrating player rankings, according to example embodiments.

FIG. 5B is a block diagram illustrating an exemplary graphical user interface 550, according to example embodiments. GUI 550 may include a graphical representation of goalkeeper dynamic embedding clusters. For example, as previously stated, because the dynamic embedding features capture differences between goalkeepers, one should be able to see significant separation in the data set, and more specifically, should see elite shot stoppers in one cluster 552 and poor shot stoppers in another cluster 554. Due to the high dimensionality of the embeddings, in some embodiments, scoring prediction agent 120 may apply a t-distributed stochastic neighbor embedding (t-SNE) multi-dimensional reduction technique to identify one or more clusters (e.g., cluster 552 and cluster 554). As illustrated, the top rated goalkeepers are included in the top cluster (i.e., cluster 552) and the bottom rated goalkeepers are included in the bottom cluster (i.e., cluster 554).

Figure 6A:
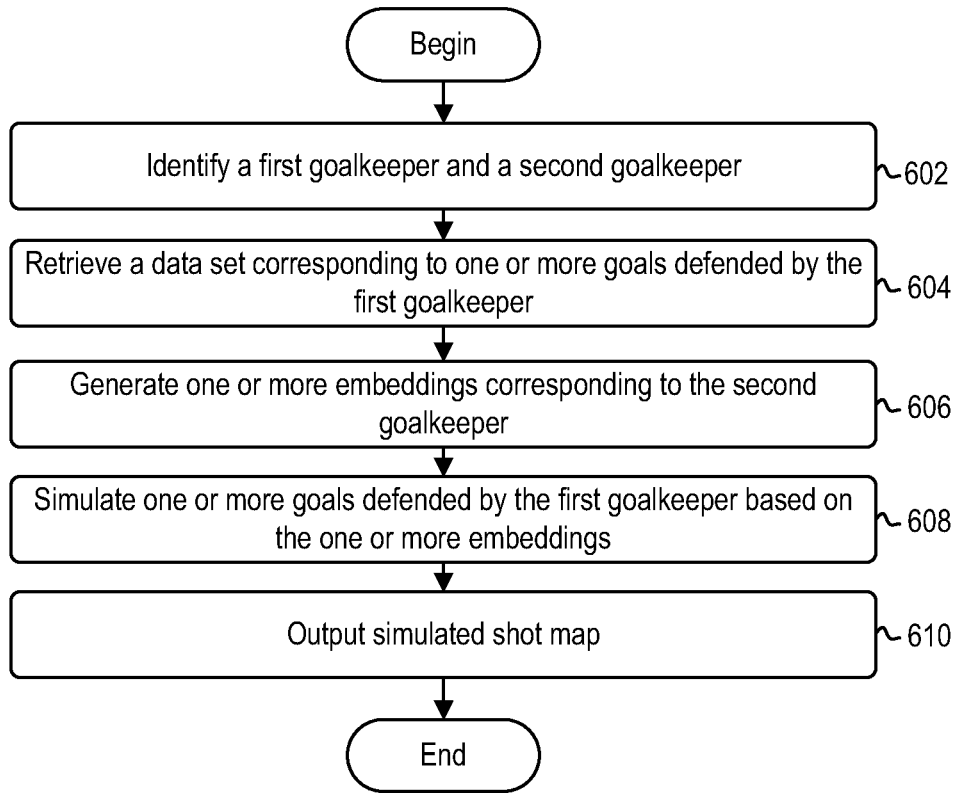
FIG. 6A is a flow diagram illustrating a method of comparing players using a simulation process, according to example embodiments.

FIG. 6A is a flow diagram is a flow diagram illustrating a method 600 of comparing goalkeepers using a simulation process, according to example embodiments. Method 600 may begin at step 602.

At step 602, scoring prediction agent 120 may identify a first goalkeeper and a second goalkeeper. In some embodiments, scoring prediction agent 120 may receive a request from client device 108, via application 132, to compare the second goalkeeper to the first goal keeper. For example, scoring prediction agent 120 may receive a request to generate a more personalized goals allowed prediction by seeing how the second goalkeeper would do in place of the first goalkeeper.

At step 604, scoring prediction agent 120 may retrieve data corresponding to one or more goals defended by the first goalkeeper. For example, scoring prediction agent 120 may retrieve one or more parameters associated with one or more goals defended by the first goalkeeper over a selected period, t, where t may represent a single shot attempt, a single game, a set of games, a single season, multiple seasons, a career, etc. Such parameters may include, but are not limited to, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 606, scoring prediction agent 120 may generate one or more embeddings of the second goalkeeper. For example, scoring prediction agent 120 may inject personalized descriptor of the second goalkeeper into the extracted parameters. By injecting the one or more personalized embeddings into the data set corresponding to the one or more goals defended by the first goalkeeper, scoring prediction agent 120 effectively swaps goalkeeper identities to simulate how the second goalkeeper would have done against the one or more goals the first goalkeeper faced.

At step 608, scoring prediction agent 120 may simulate a number of goals the second goalkeeper would concede/block based on the identified set of goals during the time, t, and the one or more embeddings of the second goalkeeper. For example, scoring prediction agent 120 may simulate the number of goals based on the personalized descriptor of the second goalkeeper, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 610, scoring prediction agent 120 may output a graphical representation comparing the second goalkeeper to the first goalkeeper. In some embodiments, scoring prediction agent 120 may output a graphical representation on a shot-by-shot basis. For example, scoring prediction agent 120 may generate a shot simulation chart illustrating the number of goals conceded by the second goalkeeper in relation to the first goalkeeper. An exemplary graphical representation is discussed below in conjunction with FIG. 6B.

Example

To demonstrate the ability of scoring prediction agent 120 in simulating goalkeeper skill, every goalkeeper who faced greater than sixty goals from the "Big Five Leagues" in Europe for the 2017/2018 seasons were simulated by swapping in their dynamic embeddings. The following are the results.

TABLE 1

Top 10 Goalkeepers

| Goalkeeper | Team | Goals +/− |
|---|---|---|
| Jan Oblak | Atletico Madrid | 0.98 |
| David De Gea | Manchester United | 0.74 |
| Samir Handanovic | Inter Milan | 0.72 |
| Pau Lopez | Real Betis | 0.68 |
| Rob-Robert Zieler | VFB Stuttgart | 0.60 |
| Marc-Andre Ter Stegen | Barcelona | 0.59 |
| Neto | Valenica | 0.59 |
| Jiri Pavlenka | Werber Bremen | 0.59 |
| Nick Pope | Burnley | 0.43 |
| Regis Gurtner | SC Amiens | 0.41 |

TABLE 2

Bottom 10 Goalkeepers

| Goalkeeper | Team | Goals +/− |
|---|---|---|
| Raul Lizoain | Las Palmas | −0.49 |
| Bingourou Kamara | RC Strasbourg | −0.52 |
| Eiji Kawashima | RC Strasbourg | −0.54 |
| Vid Belec | Benevento | −0.56 |
| Simon Mignolet | Liverpool | −0.60 |
| Alex McCarthy | Southampton | −0.60 |
| Geronimo Rulli | Real Sociedad | −0.63 |
| Heurelho Gomes | Watform | −0.79 |
| Sergio Rico | Sevilla FC | −0.88 |
| Joe Hart | West Ham United | −1.19 |

Figure 6B:
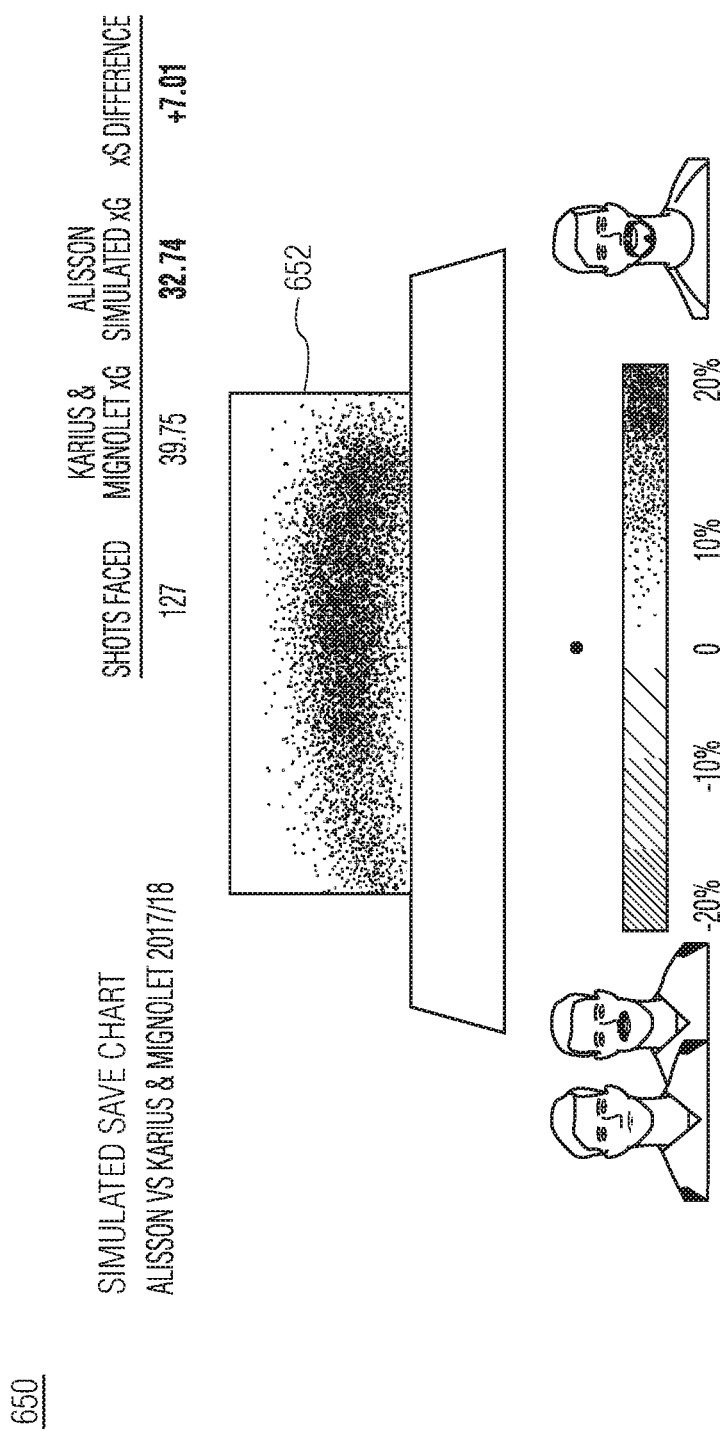
FIG. 6B is a block diagram of a graphical user interface illustrating a simulated shot map, according to example embodiments.

FIG. 6B is a block diagram of a graphical user interface 650 illustrating a simulated shot map 652, according to example embodiments. As illustrated, simulated shot map 652 may illustrate the analysis of goals defended by Liverpool goalkeepers, Loris Karius and Simon Mignolet, and how Alisson would have performed against the same shots. Such analysis may be performed using one or more operations discussed above in conjunction with FIG. 6A by, for example, swapping identities (i.e., spatial descriptors). In some embodiments, simulated shot map 652 may be a weighted two-dimensional Gaussian distribution of whether Liverpool conceded shots for the 2017/2018 season. Each shot may be weighted by the differences in the expected saves between the goalkeepers. First color shows where Alisson increased the chance of saving a shot and shows where Karius/Mignolet increases the chance. As illustrated, no part of simulated shot map 652 is second color. As such, taking every shot into account, had Alisson played for Liverpool in the 2017/2018 season, they could have expected to concede seven fewer goals.

Figure 7A:
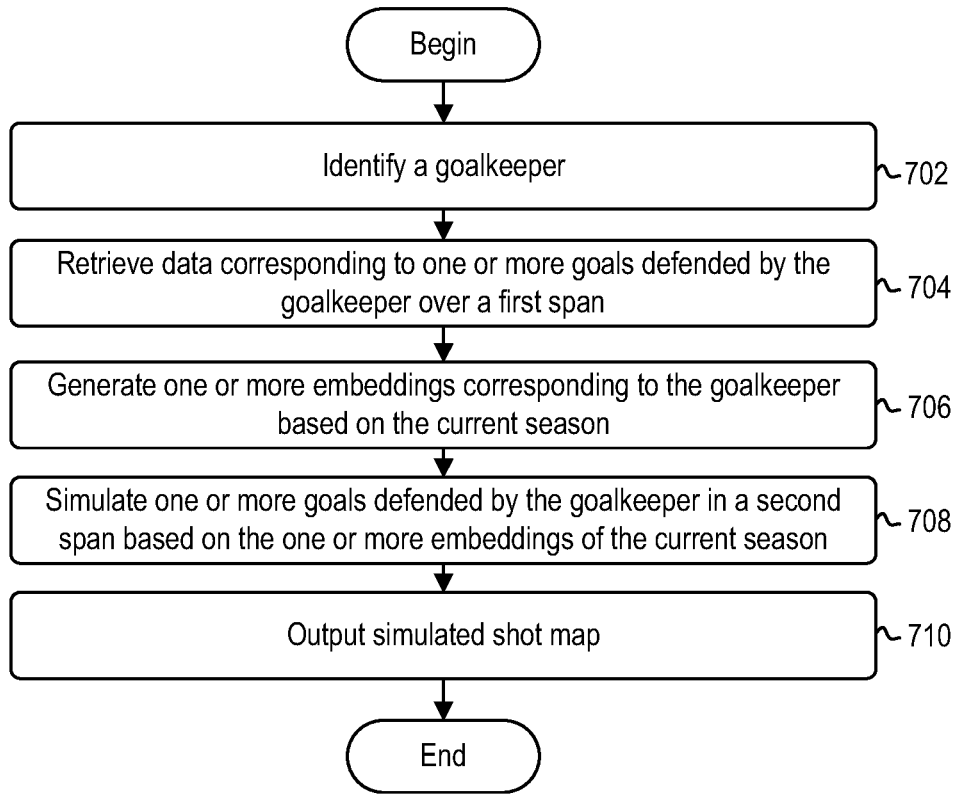
FIG. 7A is a flow diagram illustrating a method of comparing player seasons using a simulation process, according to example embodiments.

FIG. 7A is a flow diagram illustrating a method 700 of comparing goalkeeper seasons using a simulation process, according to example embodiments. Method 700 may begin at step 702.

At step 702, scoring prediction agent 120 may identify a target goalkeeper. In some embodiments, scoring prediction agent 120 may receive a request from client device 108, via application 132, to compare a target goalkeeper in his or her current form to a previous form of the goalkeeper. In other words, scoring prediction agent 120 may receive a request to analyze goalkeeper behavior to determine if a goalkeeper has improved over the course of a career, season, span of games, and the like.

At step 704, scoring prediction agent 120 retrieve data corresponding to one or more goals defended by the goalkeeper over a first span. For example, scoring prediction agent 120 may retrieve one or more parameters associated with one or more goals defended by the target goalkeeper over a first time span, t, where t may represent a single shot attempt, a single game, a set of games, a single season, multiple seasons, etc. Such parameters may include, but not limited to, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 706, scoring prediction agent 120 may generate one or more embeddings corresponding to the target goalkeeper based on a second time span, wherein the second time span is different from the first time span. For example, scoring prediction agent 120 may inject personalized descriptor of the second goalkeeper based on the second time space into the extracted parameters. By injecting the one or more personalized embeddings into the data set corresponding to the one or more goals defended by the first goalkeeper, scoring prediction agent 120 effectively swaps goalkeeper identities to simulate how the target goalkeeper, in the form represented during the second time span, would have done against the one or more goals the target goalkeeper faced in the form represented during the first time frame. Such operations are possible due to the dynamic nature of goalkeeper embeddings that may change season-to-season, game-to-game, and the like.

At step 708, scoring prediction agent 120 may simulate a number of goals the target goalkeeper would concede/block, in the form represented in the second time span, based on the identified set of goals during the first time span and the one or more embeddings of the target goalkeeper generated using goalkeeper data in the second time span. For example, scoring prediction agent 120 may simulate the number of goals based on the personalized descriptor of the second goalkeeper in the second time span, shot start location information (e.g., x, y data coordinates), goalkeeper location (e.g., x, y, z data coordinates), a time at which the shot was taken, a score when the shot was taken, a half at which the shot was taken, the venue in which the shot was taken, striker and goalkeeper angle, distance to the center of the goal and each other, and body pose data may include, but is not limited to, shooter start position and angle, run type (e.g., stutter and speed), shot initiation (e.g., body lean angle, upper body angle, hip orientation, kicking arm position, shoulder alignment, etc.), and the like.

At step 710, scoring prediction agent 120 may output a graphical representation comparing the performances of the target goalkeeper. In some embodiments, scoring prediction agent 120 may output a graphical representation on a shot-by-shot basis. For example, scoring prediction agent 120 may generate a shot simulation chart illustrating the number of goals conceded by the target second goalkeeper had the goalkeeper been in the form represented in the second time span. An exemplary graphical representation is discussed below in conjunction with FIG. 7B.

Figure 7B:
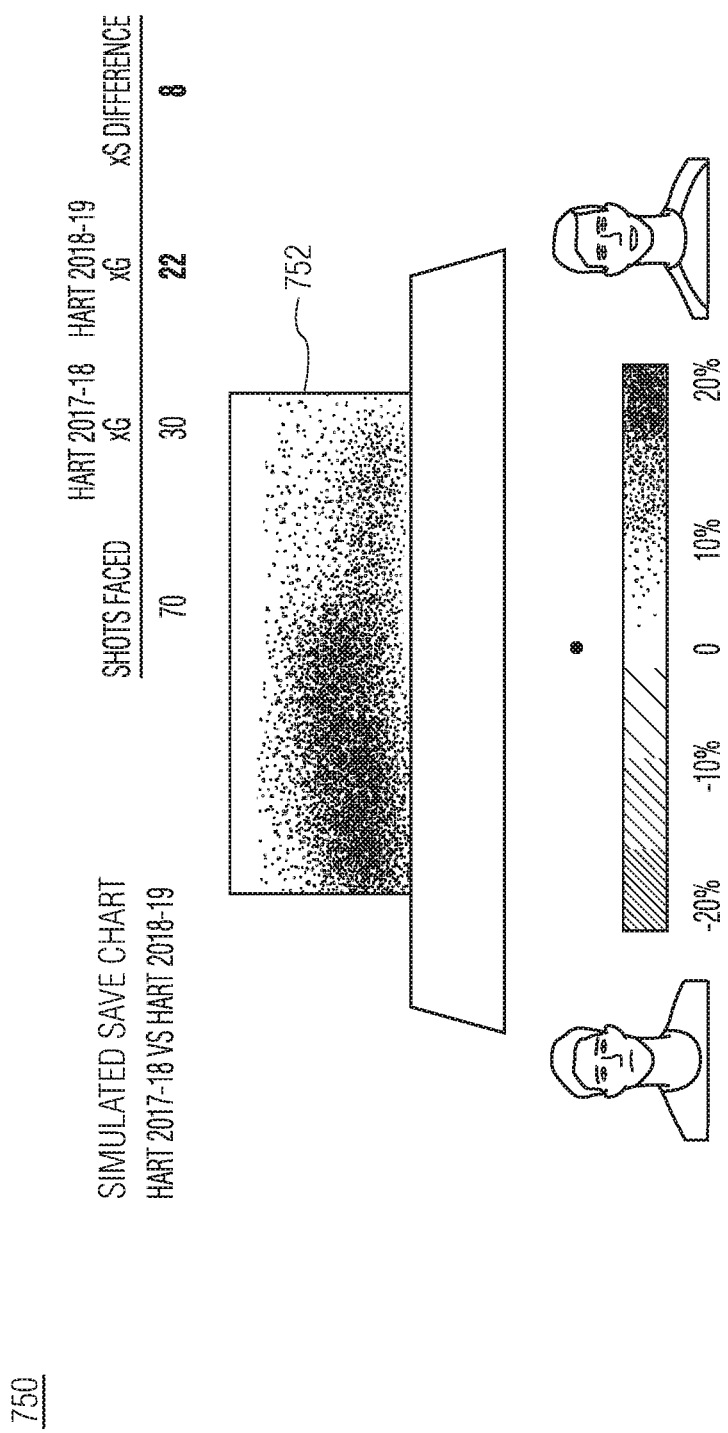
FIG. 7B is a block diagram of a graphical user interface illustrating a simulated shot map, according to example embodiments.

FIG. 7B is a block diagram of a graphical user interface 750 illustrating a simulated shot map 752, according to example embodiments. As discussed above in Table 2, Joe Hart was one of the lowest performing goalkeepers in the big 5 leagues for the 2017-18 season. Using the one or more operations discussed above in conjunction with FIG. 7A, scoring prediction agent 120 may determine whether this ranking is permanent or if it evolved over time. As previously stated, because an embedding may be dynamic in nature, scoring prediction agent 120 may be able to measure how a goalkeeper changes from, for example, season to season. Simulated shot map 150 illustrates how Joe Hart in 2018-19 form would have fared against the shot attempts that Joe Hart in 2017-18 defended. In some embodiments, simulated shot map 752 may be a weighted two-dimensional Gaussian distribution. Each shot may be weighted by the differences in the expected saves between 2018-19 Joe Hart and 2017-18 Joe hart. First color (e.g., Grey) shows where 2018-19 Joe Hart increased the chance of saving a shot and second color (e.g., shows where 2017-2018 Joe Hart increases the chance. As illustrated, no part of simulated shot map 652 is second color. As such, taking every shot into account, had 2018-19 Joe Hart played for West Ham in the 2017/2018 season instead of 2017-18 Joe Hart, they could have expected to concede eight fewer goals.

Figure 8A:
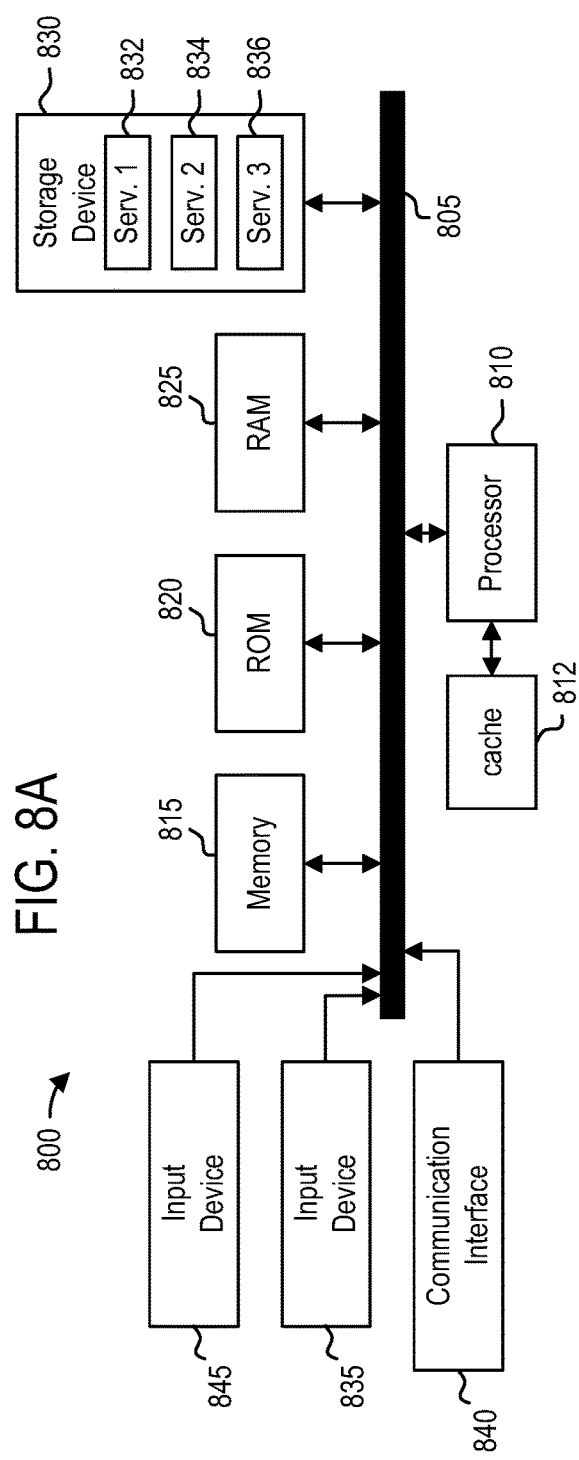
FIG. 8A is a block diagram illustrating a computing device, according to example embodiments.

FIG. 8A illustrates a system bus computing system architecture 800, according to example embodiments. System 800 may be representative of at least a portion of organization computing system 104. One or more components of system 800 may be in electrical communication with each other using a bus 805. System 800 may include a processing unit (CPU or processor) 810 and a system bus 805 that couples various system components including the system memory 815, such as read only memory (ROM) 820 and random access memory (RAM) 825, to processor 810. System 800 may include a cache of high-speed memory connected directly with, in close proximity to, or integrated as part of processor 810. System 800 may copy data from memory 815 and/or storage device 830 to cache 812 for quick access by processor 810. In this way, cache 812 may provide a performance boost that avoids processor 810 delays while waiting for data. These and other modules may control or be configured to control processor 810 to perform various actions. Other system memory 815 may be available for use as well. Memory 815 may include multiple different types of memory with different performance characteristics. Processor 810 may include any general purpose processor and a hardware module or software module, such as service 1 832, service 2 834, and service 3 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with the computing device 800, an input device 845 may represent any number of input mechanisms, such as a microphone for speech, a touch-sensitive screen for gesture or graphical input, keyboard, mouse, motion input, speech and so forth. An output device 835 may also be one or more of a number of output mechanisms known to those of skill in the art. In some instances, multimodal systems may enable a user to provide multiple types of input to communicate with computing device 800. Communications interface 840 may generally govern and manage the user input and system output. There is no restriction on operating on any particular hardware arrangement and therefore the basic features here may easily be substituted for improved hardware or firmware arrangements as they are developed.

Storage device 830 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 825, read only memory (ROM) 820, and hybrids thereof.

Storage device 830 may include services 832, 834, and 836 for controlling the processor 810. Other hardware or software modules are contemplated. Storage device 830 may be connected to system bus 805. In one aspect, a hardware module that performs a particular function may include the software component stored in a computer-readable medium in connection with the necessary hardware components, such as processor 810, bus 805, display 835, and so forth, to carry out the function.

Figure 8B:
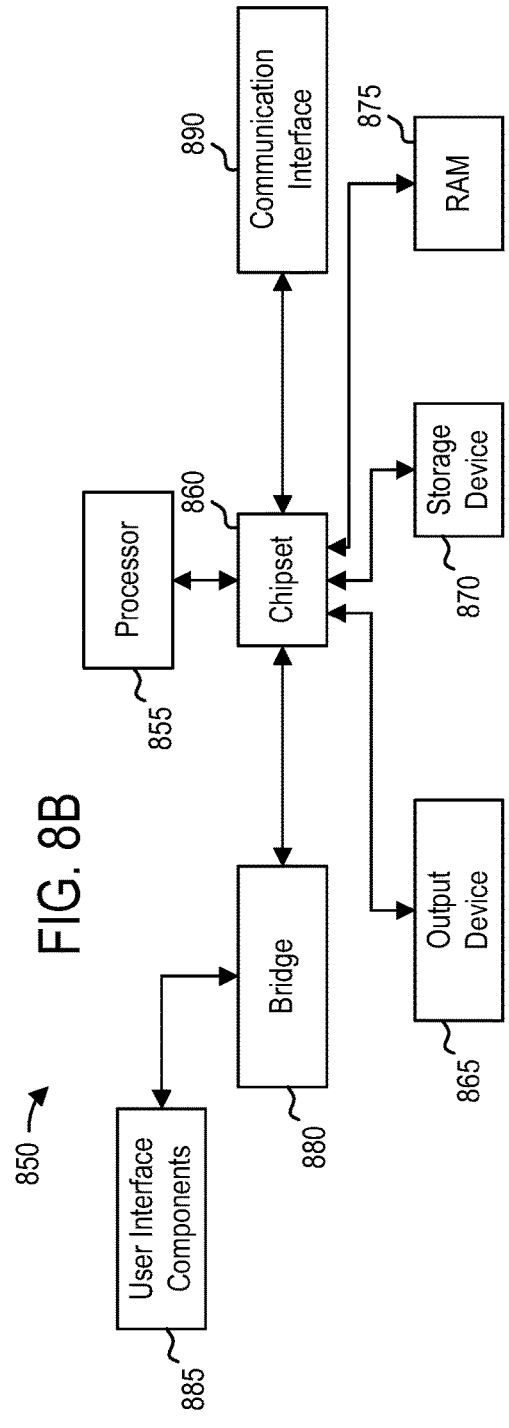
FIG. 8B is a block diagram illustrating a computing device, according to example embodiments.

FIG. 8B illustrates a computer system 850 having a chipset architecture that may represent at least a portion of organization computing system 104. Computer system 850 may be an example of computer hardware, software, and firmware that may be used to implement the disclosed technology. System 850 may include a processor 855, representative of any number of physically and/or logically distinct resources capable of executing software, firmware, and hardware configured to perform identified computations. Processor 855 may communicate with a chip set 860 that may control input to and output from processor 855. In this example, chip set 860 outputs information to output 865, such as a display, and may read and write information to storage device 870, which may include magnetic media, and solid state media, for example. Chipset 860 may also read data from and write data to RAM 875. A bridge 880 for interfacing with a variety of user interface components 885 may be provided for interfacing with chipset 860. Such user interface components 885 may include a keyboard, a microphone, touch detection and processing circuitry, a pointing device, such as a mouse, and so on. In general, inputs to system 850 may come from any of a variety of sources, machine generated and/or human generated.

Chipset 860 may also interface with one or more communication interfaces 890 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 855 analyzing data stored in storage 870 or 875. Further, the machine may receive inputs from a user through user interface components 885 and execute appropriate functions, such as browsing functions by interpreting these inputs using processor 855.

It may be appreciated that example systems 800 and 850 may have more than one processor 810 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of generating a player prediction, comprising:
    retrieving, by a computing system, data from a data store, the data comprising information for a plurality of events across a plurality of seasons;
    generating, by the computing system, a predictive model using an artificial neural network, by:
        identifying a plurality of goalkeepers from the data;
        for each goalkeeper of the plurality of goalkeepers, generating, by the artificial neural network, personalized embeddings based on the information, the personalized embeddings capturing an influence of the goalkeeper on a respective scoring event attempt;
        selecting, from the data, a set of features related to each scoring event attempt captured in the data; and
        learning, by the artificial neural network, an outcome of each scoring event attempt based at least on the personalized embeddings and the set of features related to each scoring event attempt;
    receiving, by the computing system, a set of data directed to a target scoring event attempt, the set of data comprising an indication of at least a target goalkeeper involved in the target scoring event attempt and one or more features related to the target scoring event attempt, the one or more features related to the target scoring event attempt comprising a first set of location coordinates cooresponding to an origination location of an offensive player initiating the target scoring event attempt and a second set of location coordinates corresponding to an initial position of the target goalkeeper when the offensive player initiated the group scoring even attempt; and
    generating, by the computing system via the predictive model, a likely outcome of the target scoring event attempt based on target personalized embeddings of the target goalkeeper and the one or more features related to the target scoring event attempt.

2. The method of claim 1, wherein selecting, from the data, the one or more features related to each scoring event attempt captured in the data, comprises:
    for each scoring event attempt, identifying at least one or more of scoring event start location information, goalkeeper location, and one or more geometric features of a corresponding scoring event attempt.

3. The method of claim 2, wherein the one or more geometric features of the corresponding scoring event attempt comprises at least one or more of an angle between a respective offensive player and a respective goalkeeper, a first distance from the respective offensive player to the center of a goal, and a second distance from the respective goalkeeper to the center of the goal.

4. The method of claim 2, further comprising:
    for each scoring event attempt, identifying body pose information related to a respective offensive player of the corresponding scoring event attempt.

5. The method of claim 1, further comprising:
    identifying, by the computing system, a set of scoring event attempts over a first duration;
    simulating, by the computing system, a number of scoring event attempts an average goalkeeper would concede based on one or more parameters associated with the set of scoring event attempts;
    identifying, by the computing system, a set of goalkeepers, each goalkeeper associated with a respective set of embeddings;
    for each goalkeeper in the set of goalkeepers, simulating a number of scoring event attempts a corresponding goalkeeper would concede based on the one or more parameters associated with the set of scoring event attempts and a respective set of embeddings; and
    generating, by the computing system, a graphical representation ranking each goalkeeper of the set of goalkeepers based on expected scoring events conceded compared to the average goalkeeper.

6. The method of claim 1, further comprising:
    identifying, by the computing system, a first goalkeeper and one or more scoring event attempts defended by the first goalkeeper over a first duration;
    generating, by the computing system, a data set corresponding to one or more parameters associated with the one or more scoring event attempts defended by the first player over the first duration;
    identifying, by the computing system, a second goalkeeper, wherein the second goalkeeper is associated with a set of embeddings;
    simulating, by the computing system, a number of goals the second goalkeeper would concede based on the one or more parameters associated with the one or more scoring event attempts defended by the first goalkeeper and the one or more personalized embeddings; and
    generating, by the computing system, a graphical representation comparing the number of goals the second goalkeeper would concede compared to a number of goals the first goalkeeper conceded.

7. The method of claim 1, further comprising:
identifying, by the computing system, a goalkeeper and one or more scoring event attempts defended by the goalkeeper over a first duration;
generating, by the computing system, a data set corresponding to one or more parameters associated with the one or more scoring event attempts defended by the goalkeeper over the first duration;
identifying, by the computing system, one or more embeddings associated with the goalkeeper, wherein the set of embeddings correspond to attributes of the goalkeeper over a second duration;
simulating, by the computing system, a number of goals the goalkeeper would concede based on the one or more parameters associated with the one or more scoring event attempts defended by the goalkeeper and the set of embeddings corresponding to the attributes of the goalkeeper over the second duration; and
generating, by the computing system, a graphical representation comparing the number of goals the goalkeeper would concede based on the attributes over the second duration compared to a number of goals the goalkeeper conceded in the first duration.

8. A system for generating a goalkeeper prediction, comprising:
a processor; and
a memory having programming instructions stored thereon, which, when executed by the processor, performs one or more operations, comprising:
retrieving data from a data store, the data comprising information for a plurality of events across a plurality of seasons;
generating a predictive model using an artificial neural network, the predictive model trained to predict an outcome of a shot attempt, by:
identifying a plurality of goalkeepers from the data;
for each goalkeeper, generating, by the artificial neural network, personalized embeddings based on the information, the personalized embeddings capturing an influence of the goalkeeper on a respective shot attempt;
selecting, from the data, a set of features related to each shot attempt captured in the data; and
learning, by the artificial neural network, an outcome of each shot attempt based at least on the one or more personalized embeddings and the set of features related to each shot attempt;
receiving a set of data directed to a target shot attempt, the set of data comprising an indication of a target goalkeeper involved in the target shot attempt and one or more features related to the target shot attempt, the one or more features related to the target shot attempt comprising a first set of location coordinates corresponding to an origination location of an offensive goalkeeper initiating the target shot attempt and a second set of location coordinates corresponding to an initial position of the target goalkeeper when the offensive goalkeeper initiated the target shot attempt; and
generating, via the predictive model, a likely outcome of the target shot attempt based on target personalized embeddings of the target goalkeeper and the one or more features related to the target shot attempt.

9. The system of claim 8, wherein selecting, from the data, the one or more features related to each shot attempt captured in the data, comprises:
for each shot attempt, identifying at least one or more of shot start location information, goalkeeper location, and one or more geometric features of a corresponding shot attempt.

10. The system of claim 9, wherein the one or more geometric features of the corresponding shot attempt comprises at least one or more of an angle between a respective striker and a respective goalkeeper, a first distance from the respective striker to the center of a goal, and a second distance from the respective goalkeeper to the center of the goal.

11. The system of claim 9, further comprising:
for each shot attempt, identifying body pose information related to a respective offensive goalkeeper of a corresponding shot attempt.

12. The system of claim 8, wherein the one or more operations further comprise:
identifying a set of shots over a first duration;
simulating a number of goals an average goalkeeper would concede based on one or more parameters associated with the set of shots;
identifying a set of goalkeepers, each goalkeeper associated with a respective set of personalized embeddings;
for each goalkeeper in the set of goalkeepers, simulating a number of goals a corresponding goalkeeper would concede based on the one or more parameters associated with the set of shots and the respective set of personalized embeddings; and
generating a graphical representation ranking each goalkeeper of the set of goalkeepers based on expected saves compared to the average goalkeeper.

13. The system of claim 8, wherein the one or more operations further comprise:
identifying a first goalkeeper and one or more shots defended by the first goalkeeper over a first duration;
generating a data set corresponding to one or more parameters associated with the one or more shots defended by the first goalkeeper over the first duration;
identifying a second goalkeeper, wherein the second goalkeeper is associated with a set of personalized embeddings;
simulating a number of goals the second goalkeeper would concede based on the one or more parameters associated with the one or more shots defended by the first goalkeeper and the set of personalized embeddings; and
generating a graphical representation comparing the number of goals the second goalkeeper would concede compared to a number of goals the first goalkeeper conceded.

14. The system of claim 8, wherein the one or more operations further comprise:
identifying a goalkeeper and one or more shots defended by the goalkeeper over a first duration;
generating a data set corresponding to one or more parameters associated with the one or more shots defended by the goalkeeper over the first duration;
identifying a set of personalized embeddings associated with the goalkeeper, wherein the set of personalized embeddings correspond to attributes of the goalkeeper over a second duration;
simulating a number of goals the goalkeeper would concede based on the one or more parameters associated with the one or more shots defended by the goalkeeper and the set of personalized embeddings corresponding to the attributes of the goalkeeper over the second duration; and generating a graphical representation comparing the number of goals the goalkeeper would concede based on the attributes over the second duration compared to a number of goals the goalkeeper conceded in the first duration.

15. A non-transitory computer readable medium including one or more sequences of instructions that, when executed by the one or more processors, causes a computing system to perform operations comprising:

retrieving, by a computing system, data from a data store, the data comprising information for a plurality of events across a plurality of seasons;

generating, by the computing system, a predictive model using an artificial neural network, the predictive model configured to predict an outcome of a shot attempt by:
identifying a plurality of goalkeepers from the data;
for each goalkeeper of the plurality of goalkeepers, generating, by the artificial neural network, personalized embeddings based on the information, the personalized embeddings capturing an influence of the goalkeeper on a respective shot attempt;
selecting, from the data, a set of features related to each shot attempt captured in the data; and
learning, by the artificial neural network, an outcome of each shot attempt based at least on the personalized embeddings and the set of features related to each shot attempt;

receiving, by the computing system, a set of data directed to a target shot attempt, the set of data comprising an indication of a target goalkeeper involved in the target shot attempt and one or more features related to the target shot attempt, the one or more features related to the target shot attempt comprising a first set of location coordinates corresponding to an origination location of an offensive player initiating the target shoet attempt and a second set of location coordinates corresponding to an initial position of the target goalkeeper when the offensive player initiated the target shot attempt; and generating, by the computing system via the predictive model, a likely outcome of the target shot attempt based on target personalized embeddings of the goalkeeper and the one or more features related to the target shot attempt.

16. The non-transitory computer readable medium of claim 15, wherein selecting, from the data, the one or more features related to each shot attempt captured in the data, comprises:
for each shot attempt, identifying at least one or more of shot start location information, goalkeeper location, and one or more geometric features of a corresponding shot attempt.

17. The non-transitory computer readable medium of claim 16, wherein the one or more geometric features of the corresponding shot attempt comprises at least one or more of an angle between a respective offensive player and a respective goalkeeper, a first distance from the respective offensive player to a center of a goal, and a second distance from the respective goalkeeper to the center of the goal.

18. The non-transitory computer readable medium of claim 15, further comprising:

identifying, by the computing system, a set of goals over a first duration;
simulating, by the computing system, a number of goals an average goalkeeper would concede based on one or more parameters associated with the set of goals;
identifying, by the computing system, a set of goalkeepers, each goalkeeper associated with a respective set of personalized embeddings;
for each goalkeeper in the set of goalkeepers, simulating a number of goals a corresponding goalkeeper would concede based on the one or more parameters associated with the set of goals and the respective set of personalized embeddings; and
generating, by the computing system, a graphical representation ranking each goalkeeper of the set of goalkeepers based on expected saves compared to the average goalkeeper.

19. The non-transitory computer readable medium of claim 15, further comprising:
identifying, by the computing system, a first goalkeeper and one or more shots defended by the first goalkeeper over a first duration;
generating, by the computing system, a data set corresponding to one or more parameters associated with the one or more shots defended by the first goalkeeper over the first duration;
identifying, by the computing system, a second goalkeeper, wherein the second goalkeeper is associated with a set of personalized embeddings;
simulating, by the computing system, a number of goals the second goalkeeper would concede based on the one or more parameters associated with the one or more shots defended by the first goalkeeper and the set of personalized embeddings; and
generating, by the computing system, a graphical representation comparing the number of goals the second goalkeeper would concede compared to a number of goals the first goalkeeper conceded.

20. The non-transitory computer readable medium of claim 15, further comprising:
identifying, by the computing system, a goalkeeper and one or more shots defended by the goalkeeper over a first duration;
generating, by the computing system, a data set corresponding to one or more parameters associated with the one or more shots defended by the goalkeeper over the first duration;
identifying, by the computing system, a set of personalized embeddings associated with the goalkeeper, wherein the set of personalized embeddings correspond to attributes of the goalkeeper over a second duration;
simulating, by the computing system, a number of goals the goalkeeper would concede based on the one or more parameters associated with the one or more shots defended by the goalkeeper and the set of personalized embeddings corresponding to the attributes of the goalkeeper over the second duration; and
generating, by the computing system, a graphical representation comparing the number of goals the goalkeeper would concede based on the attributes over the second duration compared to a number of goals the goalkeeper conceded in the first duration.

* * * * *